United States Patent
Li et al.

(10) Patent No.: US 11,288,485 B2
(45) Date of Patent: Mar. 29, 2022

(54) DRIVING METHOD AND AN APPARATUS FOR A FINGERPRINT RECOGNITION DEVICE

(71) Applicant: BOE Technology Group Co., Ltd., Beijing (CN)

(72) Inventors: Changfeng Li, Beijing (CN); Haisheng Wang, Beijing (CN); Lei Wang, Beijing (CN); Yingming Liu, Beijing (CN); Xiaoliang Ding, Beijing (CN); Yapeng Li, Beijing (CN); Yuanyuan Ma, Beijing (CN); Yawei Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 129 days.

(21) Appl. No.: 16/634,286

(22) PCT Filed: Jul. 30, 2019

(86) PCT No.: PCT/CN2019/098374
§ 371 (c)(1),
(2) Date: Jan. 27, 2020

(87) PCT Pub. No.: WO2020/119135
PCT Pub. Date: Jun. 18, 2020

(65) Prior Publication Data
US 2021/0216739 A1  Jul. 15, 2021

(30) Foreign Application Priority Data

Dec. 14, 2018 (CN) .......................... 201811535591.7

(51) Int. Cl.
*G06K 9/28* (2006.01)
*G06K 9/00* (2022.01)

(52) U.S. Cl.
CPC ....... *G06K 9/0004* (2013.01); *G06K 9/00087* (2013.01)

(58) Field of Classification Search
CPC .................................................... G06K 9/0004
See application file for complete search history.

(56) References Cited

U.S. PATENT DOCUMENTS

| 10,121,050 B2 | 11/2018 | Weber et al. |
| 2004/0208346 A1 | 10/2004 | Baharav et al. |

(Continued)

FOREIGN PATENT DOCUMENTS

| CN | 105632416 A | 6/2016 |
| CN | 107133613 A | 9/2017 |

(Continued)

OTHER PUBLICATIONS

OA1 in CN201811535591.7.
ISR and WO in PCT/CN2019/098374.

*Primary Examiner* — Brian Werner
(74) *Attorney, Agent, or Firm* — IPro, PLLC

(57) ABSTRACT

Disclosed herein includes a method, an apparatus, a display device and storage medium storing computer executable instructions for fingerprint recognition. The method may comprise turning on a first subset of a plurality of light sources located on an apparatus, capturing a first fingerprint acquisition frame using a plurality of image sensors on the apparatus, turning on a second subset of the plurality of light sources, and capturing a second fingerprint acquisition frame using the plurality of image sensors. The first fingerprint acquisition frame may include a first set of valid image zones and a first set of invalid image zones. The second fingerprint acquisition frame may include a second set of valid image zones and a second set of invalid image zones. The second set of valid image zones at least partially covers (Continued)

areas of a finger touching interface different from the first set of valid image zones.

18 Claims, 25 Drawing Sheets

(56) References Cited

U.S. PATENT DOCUMENTS

| | | | | |
|---|---|---|---|---|
| 2006/0275959 | A1* | 12/2006 | Huang | H01L 51/107 |
| | | | | 438/149 |
| 2014/0355846 | A1* | 12/2014 | Lee | G06K 9/0004 |
| | | | | 382/124 |
| 2016/0078270 | A1* | 3/2016 | Lee | G06K 9/001 |
| | | | | 382/125 |
| 2018/0005007 | A1 | 1/2018 | Du et al. | |
| 2018/0269240 | A1* | 9/2018 | Mainguet | H01L 27/14643 |
| 2018/0300525 | A1* | 10/2018 | Fourre | G06K 9/00093 |
| 2019/0005294 | A1 | 1/2019 | Hu et al. | |
| 2020/0242317 | A1* | 7/2020 | Hu | G06K 9/00067 |
| 2020/0302202 | A1* | 9/2020 | Beaudet | G06K 9/4614 |

FOREIGN PATENT DOCUMENTS

| | | | |
|---|---|---|---|
| CN | 107798273 | A | 3/2018 |
| CN | 107832752 | A | 3/2018 |
| CN | 108009533 | A | 5/2018 |
| CN | 108255369 | A | 7/2018 |
| CN | 109583420 | A | 4/2019 |
| EP | 2278529 | A1 | 1/2011 |
| KR | 101460964 | B1 | 11/2014 |
| WO | 2018157334 | A1 | 9/2018 |
| WO | 2019114276 | A1 | 6/2019 |
| WO | 2020119135 | A1 | 6/2020 |

\* cited by examiner

DRIVING METHOD AND AN APPARATUS FOR A FINGERPRINT RECOGNITION DEVICE

TECHNICAL FIELD

The present disclosure relates to the field of driving technology, particularly relates to a driving method and an apparatus of a fingerprint recognition device.

BACKGROUND

With high-speed development of technology, mobile products with biological recognition function gradually enter the life of people. Fingerprints have been with a human body since the human body was born. Fingerprints are a unique characteristic which can be used to distinguish one person from other people. Fingerprints are composed of a series of valleys and ridges on the surface of the skin of finger ends. The composition details of these valleys and ridges generally comprise branches of the ridges, ends of the ridges, arch shape, tent-type arch shape, left rotation, right rotation, spiral rotation, or double-rotation, etc., which determine the unique characteristic of fingerprints. Thus, fingerprint recognition receives wide attention.

SUMMARY

Disclosed herein is a method, comprising: driving a first subset of a plurality of light sources located on an apparatus to turn on; capturing a first fingerprint acquisition frame using a plurality of image sensors on the apparatus, here, for each light source of the plurality of light sources being turned on, light reflected from a finger touching interface forms a valid image zone and an invalid image zone, and the first fingerprint acquisition frame includes a first set of valid image zones and a first set of invalid image zones generated by the first subset of the plurality of light sources being turned on; driving a second subset of the plurality of light sources to turn on, the second subset of the plurality of light sources having no overlap with the first subset of the plurality of light sources; and capturing a second fingerprint acquisition frame using the plurality of image sensors, here, the second fingerprint acquisition frame includes a second set of valid image zones and a second set of invalid image zones generated by the second subset of the plurality of light sources being turned on, and the second set of valid image zones at least partially covers areas of the finger touching interface different from the first set of valid image zones.

Each invalid image zone further includes a residual image zone that contains a residual image after a fingerprint acquisition frame has been captured, at least one of the plurality of image sensors is positioned in a residual image zone of the first fingerprint acquisition frame and in a valid image zone of the second fingerprint frame, and the second fingerprint acquisition frame is captured at least a preset residual image fading period later after the first fingerprint acquisition frame is captured.

The first fingerprint acquisition frame is captured during a first fingerprint acquisition cycle and the second fingerprint acquisition frame is captured in a second fingerprint acquisition cycle that is after the first fingerprint acquisition cycle; the first and second subsets of the plurality of light sources are turned on at a same time slot during their respective fingerprint acquisition cycles.

The first and second fingerprint acquisition cycles are part of a plurality of fingerprint acquisition cycles, each of the plurality of fingerprint acquisition cycles includes obtaining N fingerprint acquisition frames with N being an integer larger than one, obtaining each of the N fingerprint acquisition frames includes driving different subsets of the plurality of light sources within a finger touching zone to turn on simultaneously and obtaining electrical signals from at least some image sensors of the plurality of image sensors located in the finger touching zone, the valid image zones of any one of the N fingerprint acquisition frames do not overlap with the residual image zones of any other one of the N fingerprint acquisition frames, and a subsequent fingerprint acquisition cycle starts after a preceding fingerprint acquisition cycle has lasted the preset residual image fading period.

The second fingerprint acquisition frame is an n-th fingerprint acquisition frame during the second fingerprint acquisition cycle, and the first fingerprint acquisition frame is one of first to n-th fingerprint acquisition frames during the first fingerprint acquisition cycle, n is a positive integer less than or equal to N.

The second fingerprint acquisition frame has at least one valid image zone at least partially overlap with one residual image zone of an n-th fingerprint acquisition frame during a preceding fingerprint acquisition cycle.

The second fingerprint acquisition frame has at least one invalid image zone at least partially overlap with one residual image zone of an n-th fingerprint acquisition frame during a preceding fingerprint acquisition cycle.

The apparatus is a display panel, the plurality of light sources are sub-pixels of the display panel and the finger touching interface is a cover glass of the display panel.

The method further comprises: sequentially driving different subsets of the plurality of light sources to turn on and capturing different fingerprint acquisition frames using the plurality of image sensors; combining all captured fingerprint acquisition frames to obtain a fingerprint image; extracting a first set of fingerprint characteristics from the fingerprint image; and storing the first set of fingerprint characteristics extracted from the fingerprint image to a fingerprint database.

The method further comprises: performing fingerprint recognition by: capturing one or more fingerprint acquisition frames; obtaining a second set of fingerprint characteristics from the one or more fingerprint acquisition frames; and comparing the second set of fingerprint characteristics with the first set of fingerprint characteristics stored in the fingerprint database to determine whether there is a fingerprint match.

At least one of the one or more fingerprint acquisition frames has valid image zones overlapping with invalid image zones in another one of the one or more fingerprint acquisition frames.

The method further comprises: obtaining a set of fingerprint characteristics from the first and second fingerprint acquisition frames; and comparing the set of fingerprint characteristics with fingerprint characteristics stored in a fingerprint database.

The method further comprises: determining a finger touching zone on the apparatus, wherein the apparatus comprises a plurality of capacitive touch control electrodes configured to change their respective capacitance values in response to pressure on the finger touching interface, the plurality of light sources are located within the finger touching zone.

Disclosed herein is a computer program product comprising a non-transitory computer readable medium having instructions recorded thereon, the instructions when executed by a processor implementing any of the above methods.

Disclosed herein is an apparatus comprising: a cover glass; a plurality of light sources configured to shine their light on the cover glass when turned on; a plurality of image sensors configured to capture light reflected from the cover glass; and control circuitry configured to: drive a first subset of the plurality of light sources to turn on; capture a first fingerprint acquisition frame using at least a subset of the plurality of image sensors, here, for each light source being turned on, light reflected from the cover glass forms a valid image zone and an invalid image zone, and the first fingerprint acquisition frame includes a first set of valid image zones and a first set of invalid image zones generated by the first subset of the plurality of light sources being turned on; and perform fingerprint recognition using the first fingerprint acquisition frame.

The apparatus further comprises a substrate and a support substrate. Here, the plurality of plurality of light sources are a plurality of sub-pixels located on the substrate and the plurality of image sensors are located on the support substrate, and the support substrate is glued to the substrate.

The control circuitry is further configured to: drive a second subset of the plurality of light sources to turn on, the second subset of the plurality of light sources having no overlap with the first subset of the plurality of light sources; and capture a second fingerprint acquisition frame using at least the subset of the plurality of image sensors, here, the second fingerprint acquisition frame includes a second set of valid image zones and a second set of invalid image zones generated by the second subset of the plurality of light sources being turned on, and the second set of valid image zones at least partially cover areas of the cover glass different from the first set of valid image zones.

The apparatus further comprises combining the first and second fingerprint acquisition frames for the fingerprint recognition.

Each of the plurality of light sources is a point light source and the first subset of light sources form a repeated pattern of rectangles, polygons with more than four sides or circles.

Each of the valid image zone is formed by light reflected from a total reflection zone of one of the plurality of light sources on the cover glass.

DETAILED DESCRIPTION

Below, with reference to the attached drawings, driving methods of a fingerprint recognition apparatus, the fingerprint recognition apparatus, a computer readable storage medium and a computer apparatus according to embodiments of the present invention are described in detail, in order that the purpose and technical scheme and advantage of the present invention are more clearly presented. It should be understood that preferred embodiments described below are only used for illustration and explanation of the present invention, not used to limit the present invention. Under the condition that there is no conflict, embodiments in the application and features in the embodiments can be combined with each other. It should be noted that size and shape of each figure in the attached figures do not reflect real scale.

Their purpose is only to illustrate the content of the present invention. Also, labels which are same or similar in all figures indicate elements which are same or similar or elements and may have same or similar functions.

At present, an image sensor is combined with a fingerprint recognition apparatus to achieve fingerprint recognition function. However, when a fingerprint recognition apparatus carries out fingerprint acquisition, due to the characteristics of the image sensor, residual image can be produced. Therefore, the fingerprints acquired are not accurate, and the effectiveness of fingerprint recognition is low.

Figure 1:
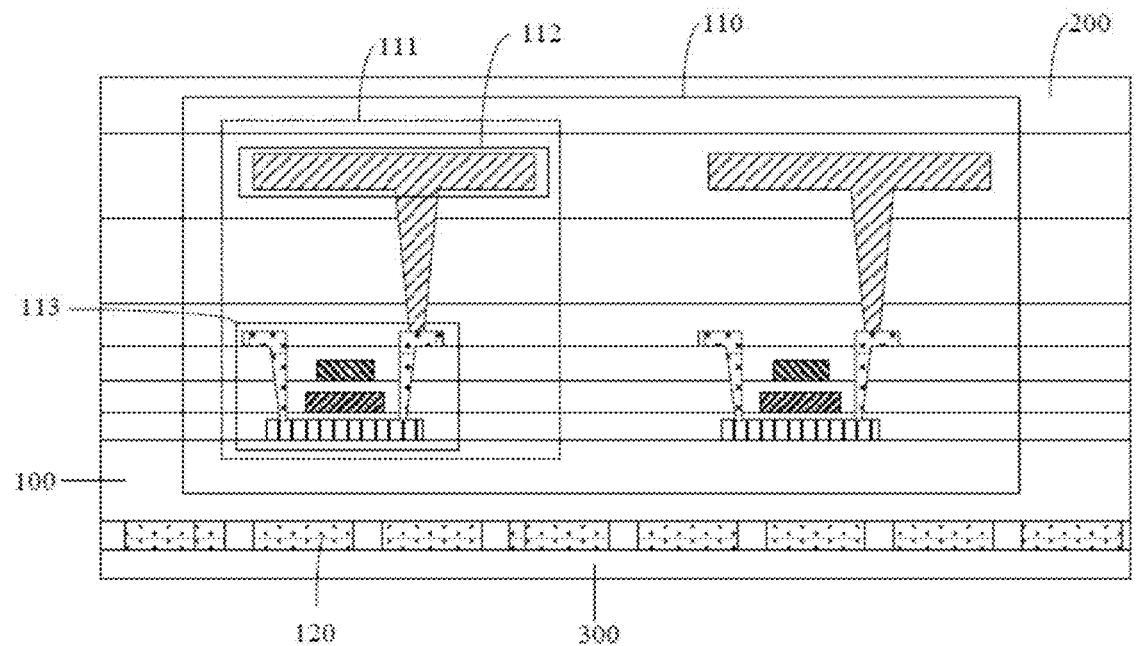
FIG. 1 schematically shows a structural diagram of a fingerprint recognition apparatus according to an embodiment of the present invention.

As shown in FIG. 1, a fingerprint recognition apparatus according to an embodiment of the present invention may comprise: a substrate 100, a plurality of pixel units 110 located at a side of the substrate 100, and a plurality of image sensors 120 located at another side of the substrate 100 facing the plurality of pixel units 110. Here, the image sensors 120 are used for receiving light rays reflected by an interface. Each pixel unit 110 comprises a plurality of sub-pixels 111. In one embodiment, the pixel unit 110 may comprise three sub-pixels 111, e.g., a red sub-pixel, a green sub-pixel and a blue sub-pixel. In another embodiment, the pixel unit 110 may also comprise four sub-pixels 111, for example, a red sub-pixel, a green sub-pixel, a blue sub-pixel and a white sub-pixel. In yet another embodiment, sub-pixels 111 in the pixel unit 110 may all be white sub-pixels. There is no limit as to the number of sub-pixels and colors of the sub-pixels.

In an embodiment, an electroluminescent diode such as an organic light emitting diode (OLED), a quantum dot light emitting diode (QLED), etc. may have self-generating light, low energy consumption, etc. In an embodiment, as shown in FIG. 1, each sub-pixel 111 may comprise an electroluminescent diode 112 and a pixel circuitry 113 used for driving the electroluminescence diode 112 to emit light. Here, the electroluminescent diode 112 may be an OLED or a QLED. Generally, a pixel circuitry may comprise a plurality of transistors such as drive transistors, switch transistors, etc., and storage capacitors. Its structure may be the same as that in the prior art. No limit is made here. In addition, in order to protect a film layer in the fingerprint recognition apparatus, as shown in FIG. 1, the fingerprint recognition apparatus may further comprise a protecting glass 200 located at a side of the sub-pixels 111 opposite the substrate 100. The protecting glass 200 is generally transparent, for example, a glass substrate. It should be noted that FIG. 1 only takes a driving transistor in the pixel circuitry 113 as an example for description.

Figure 2A:
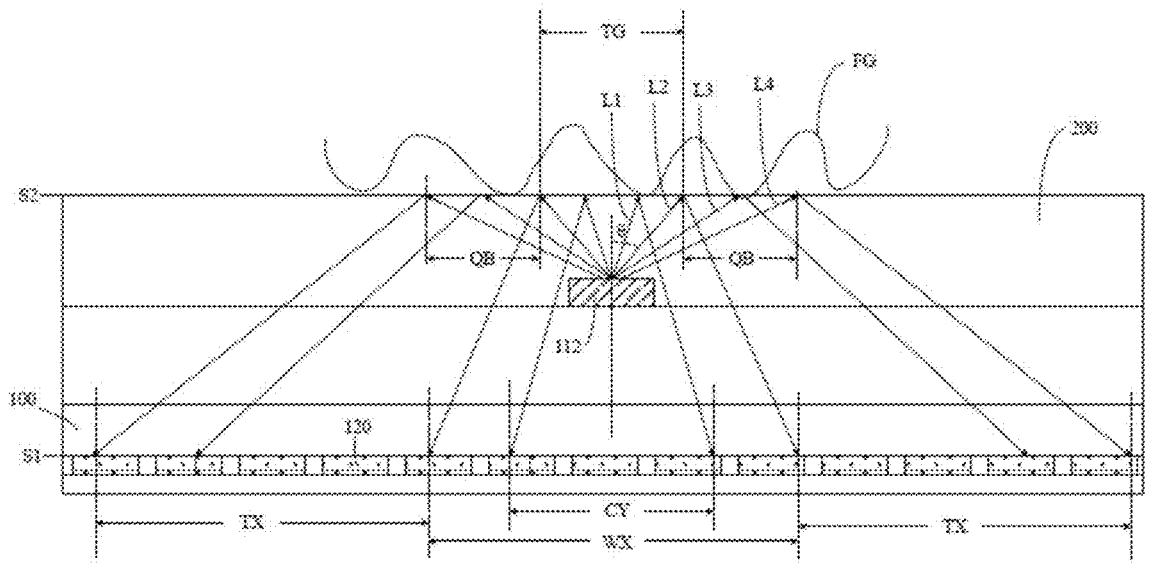
FIG. 2a schematically shows a structural diagram of a finger touch fingerprint recognition apparatus according to an embodiment of the present invention.
Figure 2B:
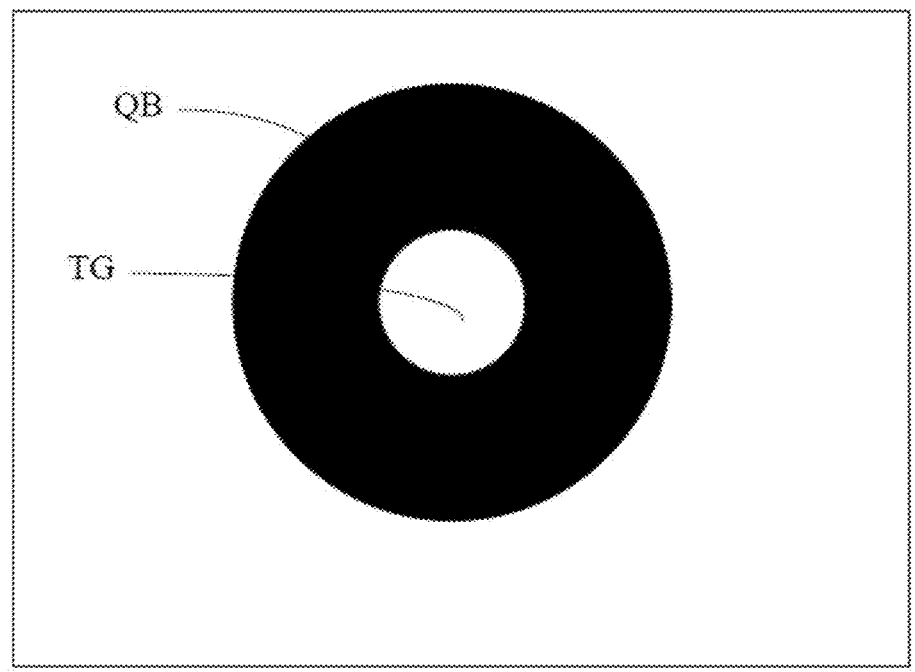
FIG. 2b schematically shows a diagram of a total reflection zone and a light transmission region according to an embodiment of the present invention.
Figure 2C:
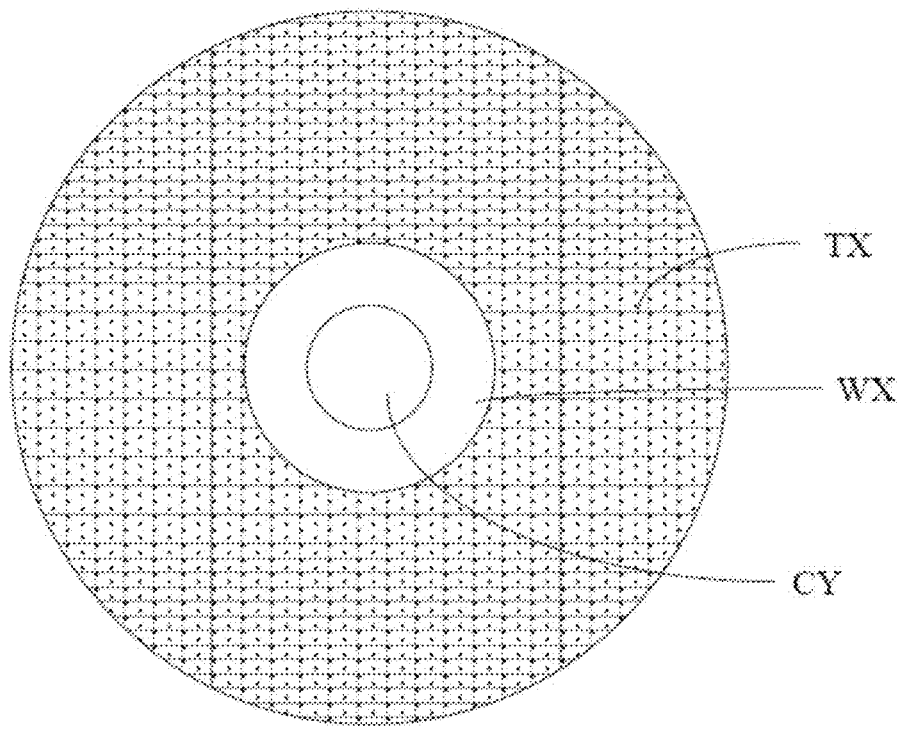
FIG. 2c schematically shows a diagram of a valid image zone, an invalid image zone and a residual image zone according to an embodiment of the present invention.

In an embodiment, at least one sub-pixel is a point light source. As shown in FIG. 2a to FIG. 2c, when a point light source emits light and fingerprint acquisition is carried out, the electroluminescent diode 112 emits light to irradiate the protective glass 200. Due to the effect of total reflection, when an incident angle of light emitted by the electroluminescent diode 112 is larger than or equal to the critical angle θ of total reflection, total reflection occurs. As a result, light rays L2-L4 cannot pass through the glass 200 and an annular total reflection zone QB may be formed. The incident angle of the light ray L1 is smaller than the critical angle θ of total reflection, it can emit to form a light transmission zone TG surrounded by the total reflection zone QB. When a finger touches the protecting glass 200, there can be a total reflection zone QB and a light transmission zone TG in an interface S2 touched by the finger. Light rays in the region where the light ray L1 is located in the light transmission region TG can be reflected by the protection glass 200, in addition, the light rays in the region can also be reflected by the interface S2 touched by the finger, the two kinds of light reflected can be incident on image sensors. However, difference between the two kinds of the reflected light is small. As a result, valley and ridge cannot be distinguished. In addition, the angle between the light ray L1 and a normal angle is relatively small, so that its light intensity is relatively high. Thus, when light in the region where the light L1 is located is incident on the image sensors after being reflected, the light sensing detection range of the image sensors 120 may be exceeded, so that valley and ridge cannot be distinguished. In this way, an invalid image zone WX is formed on the plane S1 where the image sensors 120 are located. That is, in the invalid image zone WX, although the image sensors 120 also receive light, but distinction between different light signals is low. As a result, the distinction between different light induced electric signals generated by the image sensors in the invalid image zone WX is low. As a result, valley and ridge cannot be distinguished.

Because the light intensity of the light received by image sensors in the invalid image zone WX is relatively large, after the image sensors receive light, there can be a residual image for a period of time. If the residual image does not fade, when an image sensor receives light at a subsequent time, electric signal generated by the image sensor is not accurate due to the influence of the residual image. Therefore, fingerprints acquired are not accurate. In addition, because light intensity at a center of the light transmission region TG is strongest, so that intensity of light received by image sensors at a central zone of the invalid image zone (namely, residual image zone CY) is strongest. Therefore, influence of a residual image of an image sensor in the residual image zone CY on accuracy of fingerprints acquired is largest. Accordingly, fingerprint acquisition may be carried out through light of the total reflection zone QB. In an embodiment, when the ridges of fingerprints FG touch the total reflection zone QB, the total reflection condition is destroyed. When the valley areas touch the total reflection zone QB, the total reflection condition is not destroyed in those areas. Thus, due to influence of valley and ridge, light rays in the total reflection zone QB irradiate on image sensors, a fingerprint image alternating with brightness and darkness can be formed. In this way, when a point light source emits light, the light emitted by the point light source and in the total reflection zone QB forms an annular valid image zone TX on a plane S1 where the image sensors 120 are located after being reflected by an interface touched by a finger. In addition, the valid image zone TX surrounds the invalid image zone WX. The invalid image zone WX has a residual image zone CY. Here, the central zone of the invalid image zone WX can be a residual image zone CY. Of course, the residual image zone CY may be determined by design according to actual application environment. No limit is made here.

Figure 3:
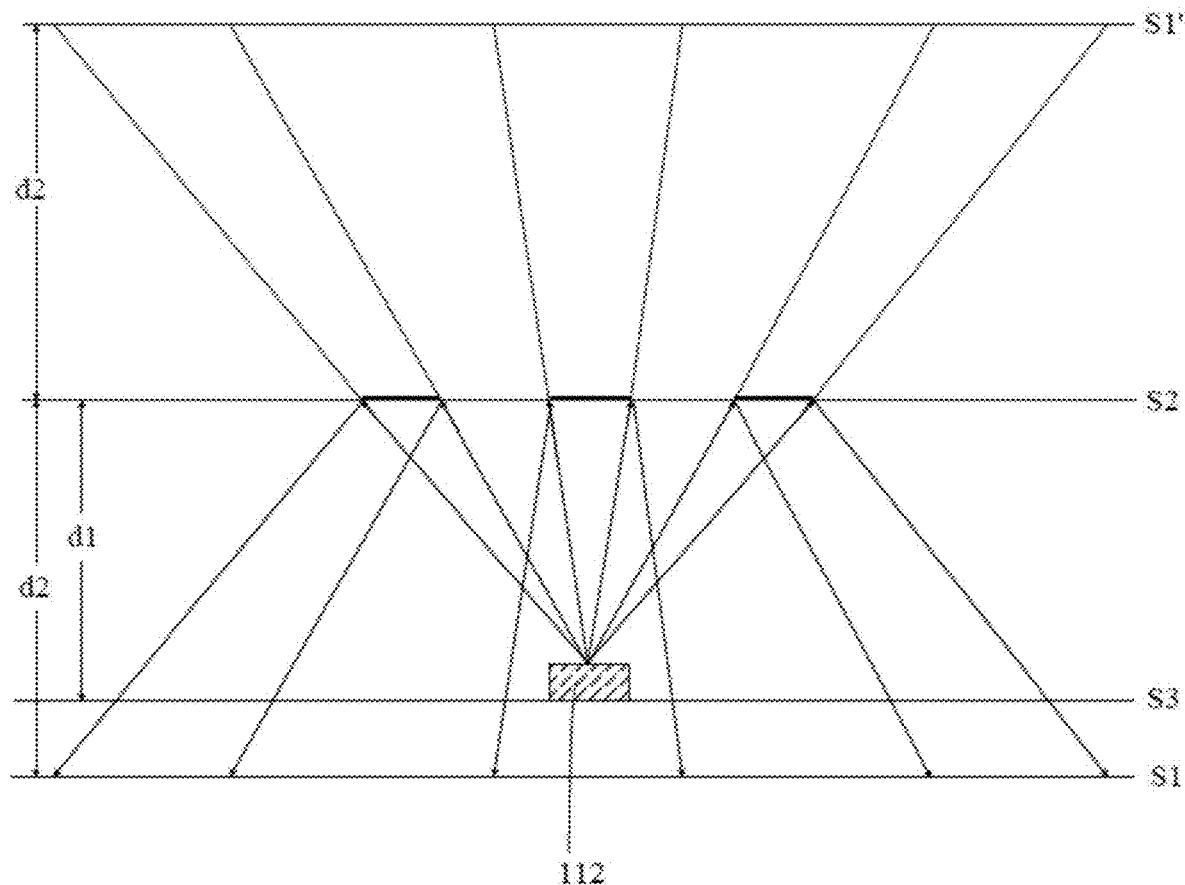
FIG. 3 schematically shows a diagram of amplification ratios according to an embodiment of the present invention.

As shown in FIG. 2a to FIG. 3, S1 represents a plane where the image sensors 120 are located. S1' represents a mirror plane of S1. S2 represents a plane of an interface where fingers FG touch. S3 represents a plane where an electroluminescent diode 112 in a point light source is located. d1 represents the distance between the plane S2 where the interface touched by the finger is located and the plane S3 where the sub-pixels of point light sources which emit light are located. d2 represents the distance between the plane S2 where the interface touched by the finger is located and the plane S1 where the image sensors are located. Because d2>d1, it can be seen that a fingerprint image formed on the image sensor is an amplified image compared with the original fingerprint. In addition, the amplification ratio A can satisfy the formula:

$$A = \frac{d1 + d2}{d1}.$$

The area of the invalid image zone SWX and the area of the light transmission zone STG satisfy the formula: SWX=A²*STG.

Figure 4:
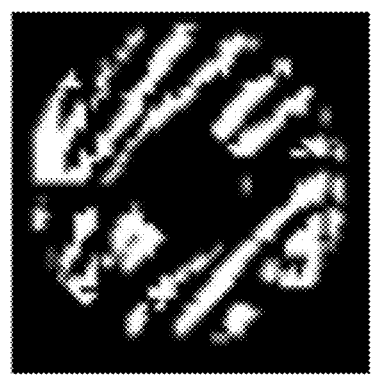
FIG. 4 schematically shows a simulation diagram of a fingerprint image obtained when fingerprints touch a total reflection zone.

In addition, a simulation result for a fingerprint image obtained when fingers touch the total reflection zone QB is shown in FIG. 4. As can be seen from FIG. 4, the valid image zone of the formed fingerprint image is annular. There is a missing part at a center. The missing part is located in the invalid image zone, and the missing fingerprint corresponds to the fingerprint in the light transmitting region. In order to obtain the fingerprint of the missing part at the center, an electroluminescent diode adjacent to the electroluminescent diode 112 that is emitting light in FIG. 2a may be controlled to emit light at a subsequent time, so that the missing part in FIG. 3 may be covered or obtained at the subsequent time. However, due to characteristics of an image sensor, after the image sensor receives light, there can be a residual image for a period of time. If the residual image doe not fade, when the image sensor receives light at a subsequent time, electric signal generated by the image sensor is not accurate due to influence of the residual image. Thus, the fingerprints acquired are not accurate, and the effectiveness of fingerprint recognition may be low.

Based on this, an embodiment provides a driving method of a fingerprint recognition apparatus, which is used to improve accuracy of fingerprints acquired, and to improve effectiveness of fingerprint recognition.

The driving method of the fingerprint recognition apparatus according to an embodiment may comprise a fingerprint input stage:

In the fingerprint input stage, for a same image sensor, the interval between the time when receiving light of a residual image zone and the time when receiving light of a valid image zone is at least a preset residual image fading period.

The driving method of the fingerprint recognition apparatus according to an embodiment, at the fingerprint input stage, controls that the interval between the time when light of the residual image zone is received and the time when light of the valid image zone is received by a same image sensor is at least a preset residual image fading period. Thus, the residual image generated after the image sensor receives light in the residual image zone, can fade into an error-acceptable range through the preset residual image fading period. Therefore, when light in the valid image zone is received by the image sensor, it may be regarded that the residual image has already been eliminated. Therefore, accuracy of electric signal generated by the image sensor is improved. Further, accuracy of fingerprints acquired is improved, and effectiveness of fingerprint recognition is improved.

Figure 5:
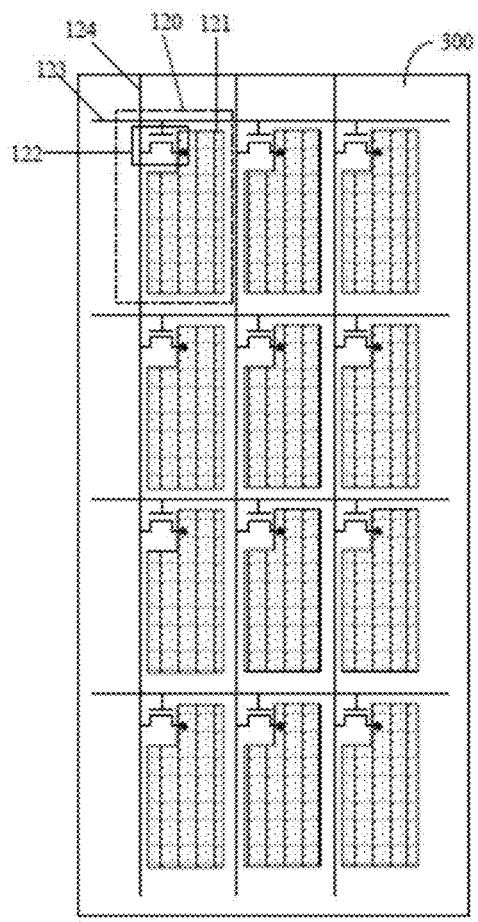
FIG. 5 schematically shows a diagram of distribution structure of image sensors located on a support substrate.

In an embodiment, as shown in FIG. 5, the image sensor 120 may comprise: a photodiode 121, and a switching transistor 122 electrically connected with the photodiode 121. In addition, the gate electrode of the switch transistor 122 is electrically connected with a fingerprint acquisition line 123. The source electrode of the switch transistor 122 is electrically connected with the photodiode 121. The drain electrode of the switch transistor 122 is electrically connected with a detection output line 124. In this way, when the fingerprint acquisition line 123 transmits gate-electrode-on signal, the switching transistor 122 is turned on, the driving circuitry with the photodiode through the detection output line 124 may be turned on, so that the driving circuitry may obtain electric signal generated by the photodiode. When the fingerprint acquisition line 123 transmits a gate-electrode-off signal, the switching transistor 122 is turned off. In this way, the driving circuitry may determine a fingerprint image according to the obtained electric signal.

In an embodiment of the present invention, the preset residual image fading period may be predetermined. The method for determining the preset residual image fading period may use the following way. As shown in FIG. 5, a light source is controlled to emit light with a preset light intensity. Within time T1, electric signal Lt1 generated by each photodiode 121 is detected. Then, the light source is turned off. Within B different times T2_b (1≤b≤B; b is a positive integer number, B is a positive integer number), electric signal Lt2_b generated by each photodiode 121 is detected. For electric signal Lt2_b detected within each time T2_b, based on electric signals Lt1 and Lt2_b generated by each photodiode 121, residual image ratio Lag_b corresponding to each photodiode 121 within time T2_b may be determined:

$$\text{Lag}\_b = \frac{Lt1 - Lt2\_b}{Lt1}.$$

Based on residual image ratio Lag_b corresponding to each photodiode 121, average value of residual image ratio corresponding to time T2_b is determined. When the average value of the residual image ratio corresponding to the time T2_b satisfies residual image elimination ratio, the time T2_b may serve as a preset residual image fading period. Here, residual image elimination ratio may be a numerical value in a range of 20%-100%. For example, the residual elimination ratio may be 20%, 50%, 70%, 80%, or 100%. Of course, if performance of a photodiode is different, time length for eliminating a residual image is also different. Thus, the numerical value of the residual image elimination ratio may be determined by design according to actual application environment. It is not restricted by the examples given here.

In an embodiment of the present invention, each point light source may be a sub-pixel. Or, each point light source may comprise all sub-pixels in a pixel unit. Or, each point light source may also comprise all sub-pixels in more than one pixel unit. Of course, different application environments have different requirements on the number of the sub-pixels in the point light source. Therefore, the number of the sub-pixels in a point light source can be determined by design according to actual application environment. It is not restricted by the examples given here.

In an embodiment, the interval between the time when the light of a residual image zone is received and the light of a valid image zone is received by a same image sensor can be a preset residual image fading period. Of course, the interval between the time when the light of a residual image zone is received and the light of a valid image zone is received by a same image sensor can be determined by design according to actual application environment. It is not restricted by the examples given here.

It should be noted that: the embodiments are intended to better explain the present invention, not to limit the present disclosure.

In an embodiment, fingerprint input stage can have a plurality of fingerprint acquisition cycles. Here, the number of the fingerprint acquisition cycles can be determined by design according to actual application environment. No limit is made here.

In an embodiment, the interval between the time when light from a residual image zone is received and the time when light from a valid image zone is received by a same image sensor is at least a preset residual image fading period.

For example, each point light source may be turned during a time slot of a light emitting sequence. Point light sources with a same light emitting sequence in two adjacent fingerprint acquisition cycles are controlled to emit light with an interval which is at least at a preset residual image fading period, so as to satisfy the condition that the interval between the time when light of a residual image zone is received and the time when light of a valid image zone is received by a same image sensor within two adjacent fingerprint acquisition cycles is at least the preset residual image fading period.

The driving method according to an embodiment controls point light sources with a same light-emitting sequence in two adjacent fingerprint acquisition cycles to emit light with an interval which is at least the preset residual image fading period, so that a residual image generated by the point light sources in a preceding fingerprint acquisition cycle may fade into an acceptable range of error after the preset residual image fading period in a subsequent fingerprint acquisition cycle. Thus, in the subsequent fingerprint acquisition cycle, the residual image may be regarded as already eliminated from the image sensor. Therefore, in the subsequent fingerprint acquisition cycle, accuracy of electric signal of image sensors in the valid image zone corresponding to the point light sources with a same light emitting sequence is improved. Further, accuracy of fingerprints acquired is improved. Effectiveness of fingerprint recognition may be improved.

Description below is given with an example that: in two adjacent fingerprint acquisition cycles, point light sources of a same light emitting sequence are controlled to emit light at an interval which is the preset residual image fading period.

In an embodiment of the present invention, each fingerprint acquisition cycle may comprise N consecutive fingerprint acquisition frames. In each fingerprint acquisition frame, a plurality of point light sources in a finger touching zone may be controlled to emit light simultaneously, and electric signals generated by each image sensor in the finger touching zone may be collected. N may be an integer larger than 1. For example, N may be set to be 2, 3, 4, 5, 6, etc., which needs to be determined by design according to actual application environment. It is not restricted by the examples given here.

Figure 6:
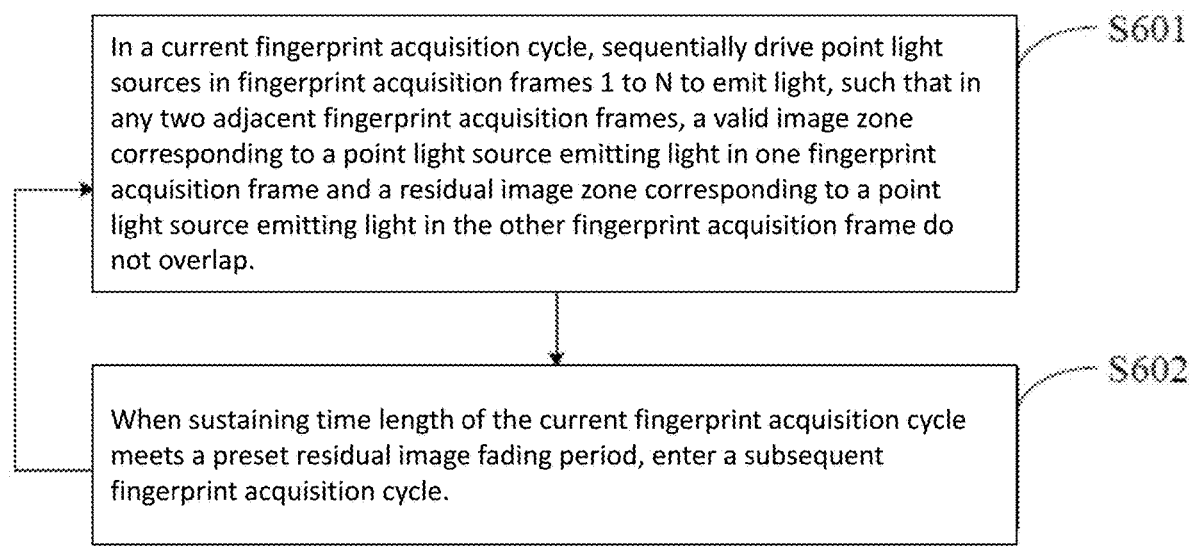
FIG. 6 is a flowchart 1 of a driving method according to an embodiment of the present invention.

In an embodiment, as shown in FIG. 6, point light sources of a same light emitting sequence in two adjacent fingerprint acquisition cycles is controlled to emit light at an interval which is at least the preset residual image fading period. This satisfies the condition that the interval between the time when light of a residual image zone is received and the time when light of a valid image zone is received by a same image sensor in two adjacent fingerprint acquisition cycles is at least the preset residual image fading period. The control may comprise the following steps:

S601: in a current fingerprint acquisition cycle, sequentially drive point light sources in fingerprint acquisition frames from 1 to N to emit light, so that valid image zones formed by point light sources emitting light in a fingerprint acquisition frame and residual image zones formed by point light sources emitting light in an adjacent fingerprint acquisition frame satisfy condition that they do not overlap with each other. In an embodiment, electric signal generated by all the image sensors in the fingerprint recognition apparatus may be collected. In another embodiment, only electric signal generated by image sensors in the finger touching zone may be collected, so that acquisition time of electric signal may be shortened. In order to determine a finger touching zone, in an embodiment, at beginning of a first fingerprint acquisition cycle, the following may be performed: obtaining a finger touching zone, e.g., an area touched by a finger, in the fingerprint recognition apparatus.

S602, when the time length of the current fingerprint acquisition cycle meets a preset residual image fading period, enter a subsequent fingerprint acquisition cycle. In an embodiment, in the current fingerprint acquisition cycle and the subsequent fingerprint acquisition cycle, point light sources emitting light are different. It should be noted that at any time the point light sources turned on to emit light simultaneously may be a subset of point light sources of a fingerprint recognition apparatus or a subset of point light sources of a touching zone of a fingerprint recognition apparatus. Moreover, the respective subset of point light sources may generate respective sets of valid image zones, invalid image zones and residual image zones correspondingly. In one embodiment, one subset of point light sources turned on at one time slot of a fingerprint acquisition cycle has no overlapping with another subset of point light sources in another time slot of the same fingerprint acquisition cycle or another time slot of a different fingerprint acquisition cycle. This may apply to all embodiments described herein.

The driving method according to an embodiment may control a plurality of point light sources to emit light and obtain electric signals generated by image sensors in a first fingerprint acquisition frame of a current fingerprint acquisition cycle. Then, in a second fingerprint acquisition frame, a plurality of point light sources may controlled to emit light and electric signal generated by image sensors are obtained. Then, the rest is carried out similarly. No redundant description is given here. Because a current fingerprint acquisition cycle can include N fingerprint acquisition frames, the current fingerprint acquisition cycle has a sustaining time length. Thus, when the sustaining time length of the current fingerprint acquisition cycle meets the preset residual image fading period, a residual image on an image sensor in the residual image zone in a first fingerprint acquisition frame in the current fingerprint acquisition cycle can be regarded as already faded, so that the current fingerprint acquisition cycle may end, and a subsequent fingerprint acquisition cycle may start. A plurality of point light sources are controlled to emit light in a first fingerprint acquisition frame of a subsequent fingerprint acquisition cycle and electric signal generated by image sensors are obtained. Then, point light sources are controlled to emit light in a second fingerprint acquisition frame and electric signal generated by image sensor are obtained. Then, the rest is carried out similarly, until all fingerprint acquisition cycles are completed, so that electric signals corresponding to the finger fingerprint are all obtained. No redundant description is given here. Therefore, accuracy of electrical signal of an image sensor can be improved, and effectiveness of fingerprint recognition may be improved. In addition, in an embodiment, the rest of the fingerprint is obtained during waiting time for the residual image to fade, so that the fingerprint input time can be reduced. Effectiveness of fingerprint recognition is further improved.

Figure 7A:
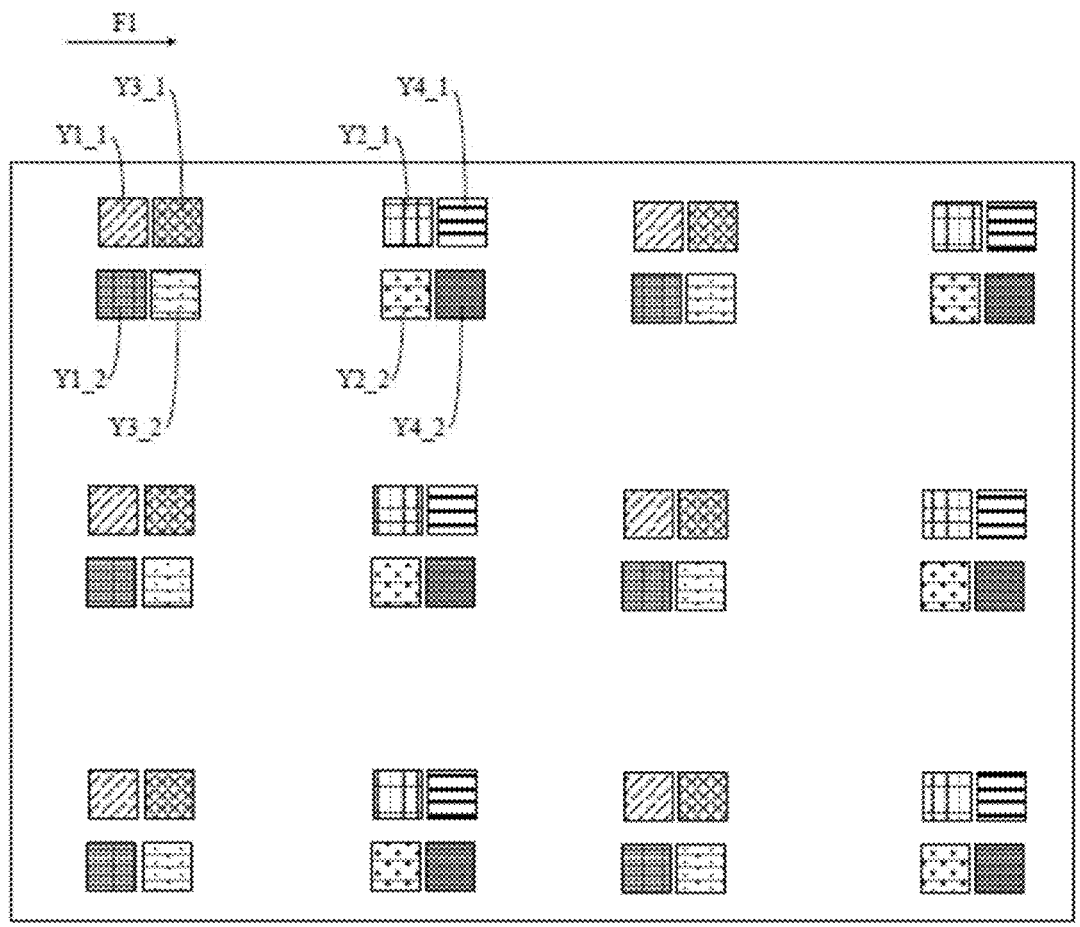
FIG. 7a schematically shows a structural diagram 1 of point light sources according to an embodiment of the present invention.
Figure 7B:
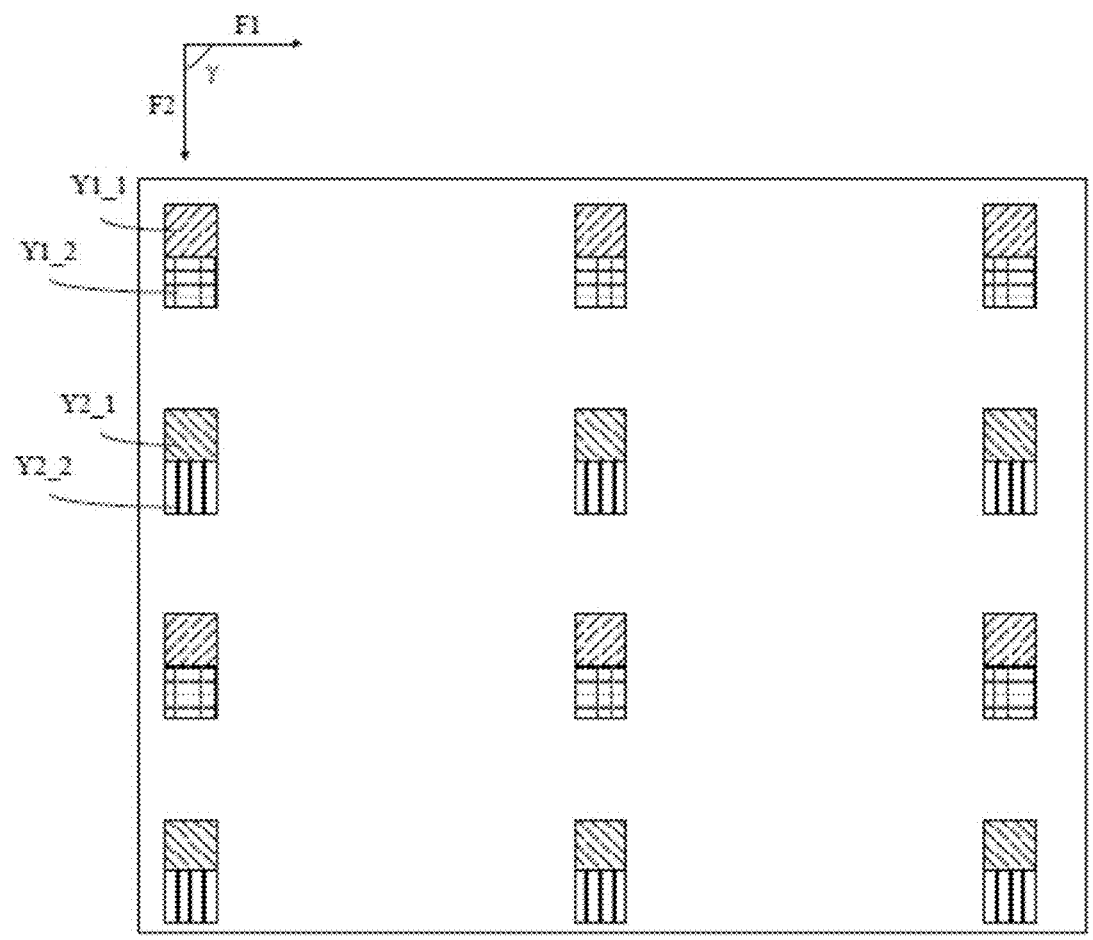
FIG. 7b schematically shows a structural diagram 2 of point light sources according to an embodiment of the present invention.
Figure 7C:
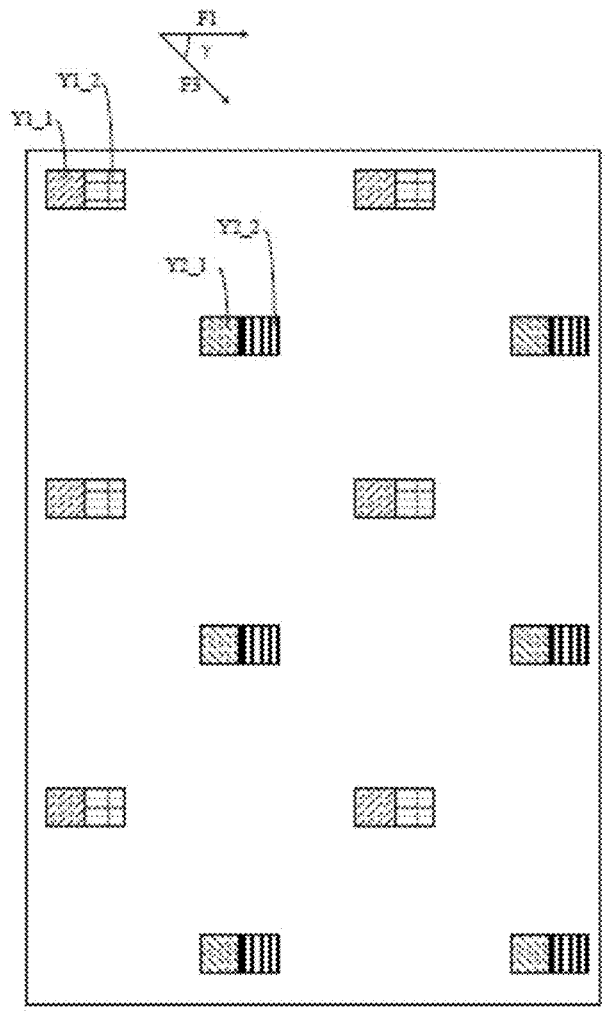
FIG. 7c schematically shows a structural diagram 3 of point light sources according to an embodiment of the present invention.

It should be noted that, in each fingerprint acquisition cycle, point light sources emitting light in an n-th fingerprint acquisition frame are point light sources having a same light emitting time slot in a lighting order, in which n is an integer greater than or equal to 1 and less than or equal to N. In an embodiment of the present invention, the patterns composed by the point light sources emitting light in each fingerprint acquisition frames are same. In this way, multiple point light sources in each fingerprint acquisition frame can move wholly. For example, taking a first fingerprint acquisition cycle and a second fingerprint acquisition cycle and each fingerprint acquisition cycle comprising four fingerprint acquisition frames (namely, first to fourth fingerprint acquisition frames) as an example, as shown in FIG. 7A, Y1_1 represents point light sources which emit light simultaneously in the first fingerprint acquisition frame in the first fingerprint acquisition cycle. Y2_1 represents point light sources which emit light simultaneously in the second fingerprint acquisition frame in the first fingerprint acquisition cycle. Y3_1 represents point light sources which emit light simultaneously in the third fingerprint acquisition frame in the first fingerprint acquisition cycle. Y4_1 represents point light sources which emit light simultaneously in the fourth fingerprint acquisition frame in the first fingerprint acquisition cycle. Y1_2 represents point light sources which emit light simultaneously in the first fingerprint acquisition frame in the second fingerprint acquisition cycle. Y2_2 represents point light sources which emit light simultaneously in the second fingerprint acquisition frame in the second fingerprint acquisition cycle. Y3_2 represents point light sources which emit light simultaneously in the third fingerprint acquisition frame in the second fingerprint acquisition cycle. Y4_2 represents point light sources which emit light simultaneously in the fourth fingerprint acquisition frame in the second fingerprint acquisition cycle. Here patterns formed by Y1_1, Y2_1, Y3_1, Y4_1, Y1_2, Y2_2, Y3_2 and Y4_2 are same. Or, taking an example that each fingerprint acquisition cycle includes two fingerprint acquisition frames (namely, first to second fingerprint acquisition frames) as an example, as shown in FIG. 7b and FIG. 7c. Y1_1 represents point light sources which emit light simultaneously in the first fingerprint acquisition frame in the first fingerprint acquisition cycle. Y2_1 represents point light sources which emit light simultaneously in the second fingerprint acquisition frame in the first fingerprint acquisition cycle. Y1_2 represents point light sources which emit light simultaneously in the first fingerprint acquisition frame in the second fingerprint acquisition cycle. Y2_2 represents point light sources which emit light simultaneously in the second fingerprint acquisition frame in the second fingerprint acquisition cycle. Here, the patterns formed by Y1_1, Y2_1, Y1_2 and Y2_2 are same.

Further, in an embodiment of the present invention, in a same fingerprint acquisition cycle, overall movement direction of the point light sources emitting light in consecutive N fingerprint acquisition frames may be row direction of the sub-pixels. For example, as shown in FIG. 7a, in a first fingerprint acquisition cycle, point light sources Y1_1 and Y2_1 move along the row direction F1 of the sub-pixels, and point light sources Y3_1 and Y4_1 move along the row direction F1 of the sub-pixels. In a second fingerprint acquisition cycle, and point light sources Y1_2 and Y2_2 move along the row direction F1 of the sub-pixels, point light sources Y3_2 and Y4_2 move along the row direction F1 of the sub-pixels.

In an embodiment of the present invention, in a same fingerprint acquisition cycle, overall movement direction of each point light source emitting light in consecutive N fingerprint acquisition frames may have an angle γ with the row direction of the sub-pixels; here, the angle γ is equal to 90 degrees. Namely, the overall movement direction of each point light source in the consecutive N fingerprint acquisition frames is the column direction F2 of the sub-pixels. For example, as shown in FIG. 7b, in a first fingerprint acquisition cycle, point light sources Y1_1 and Y2_1 move along the column direction F2 of the sub-pixels. In a second fingerprint acquisition cycle, point light sources Y1_2 and Y2_2 move along the column direction F2 of the sub-pixels.

In an embodiment of the present invention, in a same fingerprint acquisition cycle, overall moving direction of each point light source in the consecutive N fingerprint acquisition frames may be a direction which has an angle γ with the row direction F3 of the sub-pixels; here, the angle γ is larger than 0° and less than 90°. For example, as shown in FIG. 7c, in a first fingerprint acquisition cycle, point light sources Y1_1 and Y2_1 move along the direction F3. In a second fingerprint acquisition cycle, point light sources Y1_2 and Y2_2 move along the direction F3.

Of course, in an embodiment of the present invention, the above moving directions can also be combined. It needs to be determined by design according to actual application environment. It is not restricted by the examples given here.

Figure 8A:
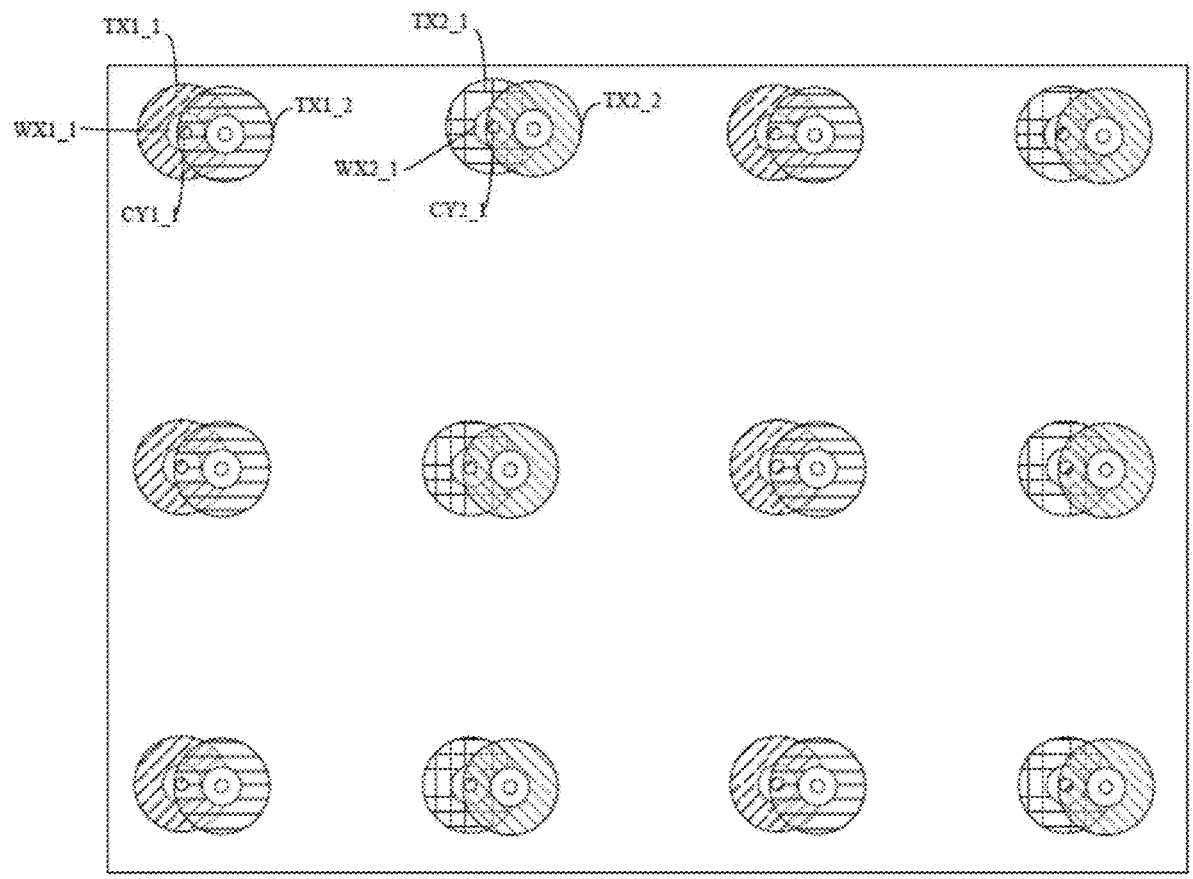
FIG. 8a schematically shows a diagram 1 of imaging zones according to an embodiment of the present invention.

In an embodiment of the present invention, in a same fingerprint acquisition cycle, a valid image zone corresponding to point light sources which emit light in a subsequent fingerprint acquisition frame does not overlap with a valid image zone corresponding to point light sources which emit light in a preceding fingerprint acquisition frame. For example, the valid image zone corresponding to the point light sources which emit light in the subsequent fingerprint acquisition frame and the valid image zone corresponding to the point light sources which emit light in the preceding fingerprint acquisition frame can satisfy condition that their distance is a preset distance, so that the valid image zone corresponding to the point light sources which emit light in the subsequent fingerprint acquisition frame is separated from the valid image zone corresponding to the point light sources which emit light in the preceding fingerprint acquisition frame. Here, the preset distance can be size of at least one sub-pixel, or can also be other distance. It needs to be determined by design according to actual application environment. No limit is made here. For example: a first fingerprint acquisition cycle and a second fingerprint acquisition cycle, and the fingerprint acquisition cycle includes two fingerprint acquisition frames (namely, a first fingerprint acquisition frame and a second fingerprint acquisition frame), as shown in FIG. 8a. TX1_1 represents a valid image zone corresponding to a point light source which emits light in the first fingerprint acquisition frame of the first fingerprint acquisition cycle. TX2_1 represents a valid image zone corresponding to a point light source which emits light in the second fingerprint acquisition frame in the first fingerprint acquisition cycle. TX1_2 represents a valid image zone corresponding to a point light source which emits light in the first fingerprint acquisition frame in the second fingerprint acquisition cycle. TX2_2 represents a valid image zone corresponding to a point light source which emits light in the second fingerprint acquisition frame in the second fingerprint acquisition cycle. Here, In the first fingerprint acquisition cycle, the valid image zone TX2_1 corresponding to the point light source which emits light in a subsequent fingerprint acquisition frame (namely, the second fingerprint acquisition frame) is separated from the valid image zone TX1_1 corresponding to the point light source which emits light in a preceding fingerprint acquisition frame (namely, the first fingerprint acquisition frame) by a certain distance. In the second fingerprint acquisition cycle, the valid image zone TX2_2 corresponding to the point light source which emits light in the a subsequent fingerprint acquisition frame (namely, the second fingerprint acquisition frame) is separated from the valid image zones TX1_2 corresponding to the point light source which emits light in a preceding fingerprint acquisition frame (namely, the first fingerprint acquisition frame) by a certain distance.

Figure 8B:
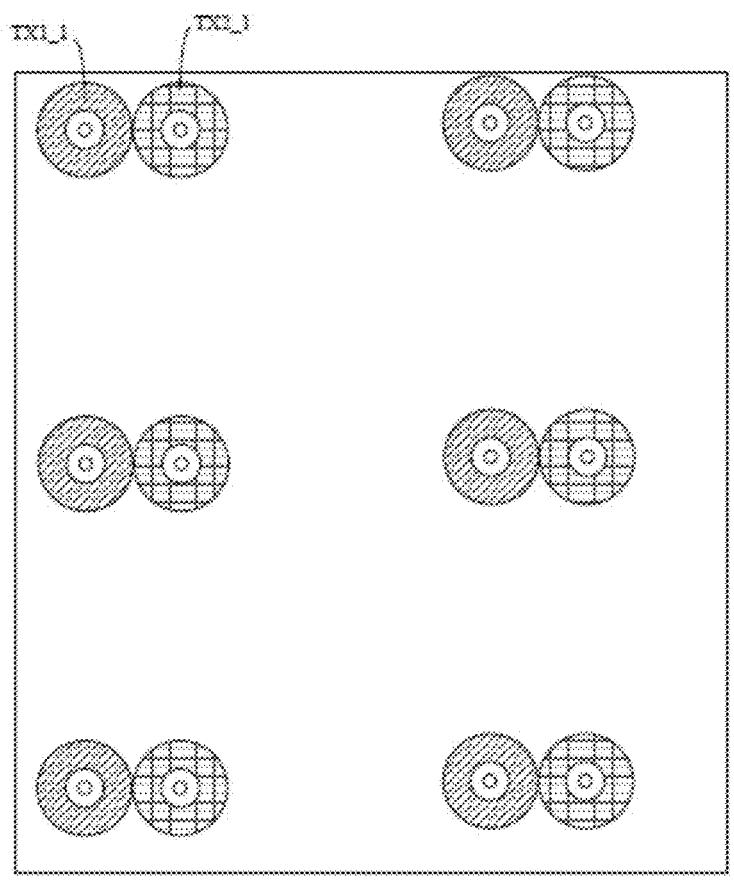
FIG. 8b schematically shows a diagram 2 of imaging zones according to an embodiment of the present invention.

In another embodiment, a valid image zone corresponding to point light sources which emit light in a subsequent fingerprint acquisition frame may be tangent to a valid image zone corresponding to point light sources which emit light in a preceding fingerprint acquisition frame. For example: a fingerprint acquisition cycle includes two fingerprint acquisition frames (namely, a first fingerprint acquisition frame and a second fingerprint acquisition frame), as shown in FIG. 8b. TX1_1 represents a valid image zone corresponding to a point light source which emits light in the first fingerprint acquisition frame in a first fingerprint acquisition cycle. TX2_1 represents a valid image zone corresponding to a point light source which emits light in the second fingerprint acquisition frame in the first fingerprint acquisition cycle. It can be seen that the valid image zone TX1_1 corresponding to the point light source which emits light in a subsequent fingerprint acquisition frame (namely, the second fingerprint acquisition frame) is tangent to the valid image zone TX2_1 corresponding to the light source which emits light in a preceding fingerprint acquisition frame (namely, the first fingerprint acquisition frame).

Figure 9:
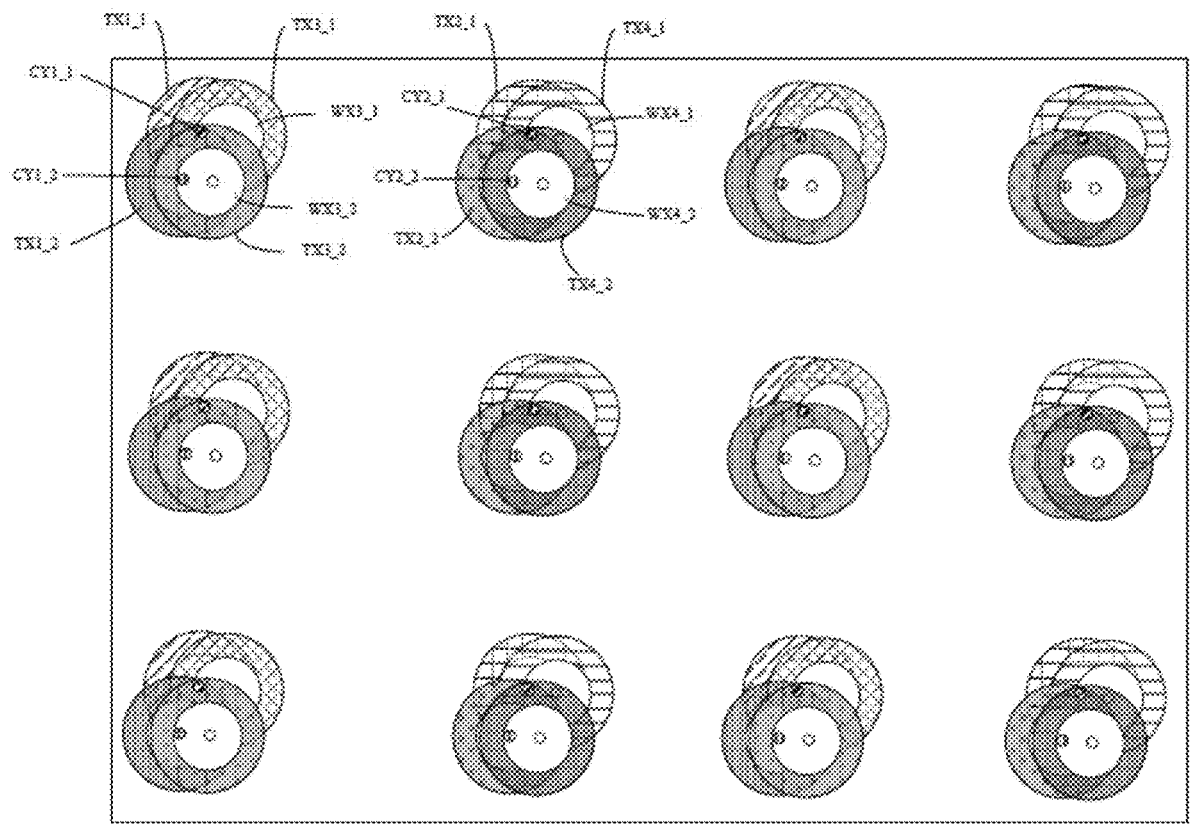
FIG. 9 schematically shows a diagram 3 of imaging zones according to an embodiment of the present invention.

In an embodiment, N can be set to be an integer greater than or equal to 3, so that a fingerprint acquisition cycle at least comprises three fingerprint acquisition frames. In an embodiment of the present invention, in a same fingerprint acquisition cycle, for two fingerprint acquisition frames separated from each other by at least one fingerprint acquisition frame, an invalid image zone corresponding to point light sources which emit light in a subsequent fingerprint acquisition frame covers a residual image zone corresponding to point light sources which emit light in a preceding fingerprint acquisition frame. In particular, for two fingerprint acquisition frames which are separated from each other by one fingerprint acquisition frame, an invalid image zone corresponding to point light sources which emit light in a subsequent fingerprint acquisition frame covers a residual image zone corresponding to point light sources which emit light in a preceding fingerprint acquisition frame. For example, take an example that a fingerprint acquisition includes four fingerprint acquisition frames (namely first to fourth fingerprint acquisition frames), as shown in FIG. 7a and FIG. 9. TX1_1 represents a valid image zone corresponding to each point light source Y1_1 which emits light in the first fingerprint acquisition frame in a first fingerprint acquisition cycle. TX2_1 represents a valid image zone corresponding to each point light source Y2_1 which emits light in the second fingerprint acquisition frame in the first fingerprint acquisition cycle. TX3_1 represents a valid image zone corresponding to each point light source Y3_1 which emits light in the third fingerprint acquisition frame in the first fingerprint acquisition cycle. TX4_1 represents a valid image zone corresponding to each point light source Y4_1 which emits light in the fourth fingerprint acquisition frame in the first fingerprint acquisition cycle. CY1_1 represents a residual image zone corresponding to each point light source Y1_1 which emits light in the first fingerprint acquisition frame in the first fingerprint acquisition cycle. CY2_1 represents a residual image zone corresponding to each point light source Y2_1 which emits light in the second fingerprint acquisition frame in the first fingerprint acquisition cycle. WX3_1 represents an invalid image zone corresponding to each point light source Y3_1 which emits light in the third fingerprint acquisition frame in the first fingerprint acquisition cycle. WX4_1 represents an invalid image zone corresponding to each point light source Y4_1 which emits light in the fourth fingerprint acquisition frame in the first fingerprint acquisition cycle. TX1_2 represents a valid image zone corresponding to each point light source Y1_2 which emits light in the first fingerprint acquisition frame in a second fingerprint acquisition cycle. TX2_2 represents a valid image zone corresponding to each point light source Y2_2 which emits light in the second fingerprint acquisition frame in the second fingerprint acquisition cycle. TX3_2 represents a valid image zone corresponding to each point light source Y3_2 which emits light in the third fingerprint acquisition frame in the second fingerprint acquisition cycle. TX4_2 represents a valid image zone corresponding to each point light source Y4_2 which emits light in the fourth fingerprint acquisition frame in the second fingerprint acquisition cycle. CY1_2 represents a residual image zone corresponding to each point light source Y1_2 which emits light in the first fingerprint acquisition frame in the second fingerprint acquisition cycle. CY2_2 represents a residual image zone corresponding to each point light source Y2_2 which emits light in the second fingerprint acquisition frame in the second fingerprint acquisition cycle. WX3_2 represents an invalid image zone corresponding to each point light source Y3_2 which emits light in the third fingerprint acquisition frame in the second fingerprint acquisition cycle. WX4_2 represents an invalid image zone corresponding to each point light source Y4_2 which emits light in the fourth fingerprint acquisition frame in the second fingerprint acquisition cycle. Here, valid image zones TX1_1-TX4_1-TX1_2-TX4_2, which correspond to each point light source which emits light from first fingerprint acquisition frames to fourth fingerprint acquisition frames in a first fingerprint acquisition cycle and a second fingerprint acquisition cycle, do not overlap with each other. In a first fingerprint acquisition cycle, WX3_1 covers CY1_1, WX4_1 covers CY2_1. In a second fingerprint acquisition cycle, WX3_2 covers CY1_2, and WX4_2 covers CY2_2.

In an embodiment of the present invention, in two adjacent fingerprint acquisition cycles, a valid image zone corresponding to each point light source which emits light in an n-th fingerprint acquisition frame of a subsequent fingerprint acquisition cycle can overlap with an invalid image zone corresponding to each point light source which emits light in at least one of fingerprint acquisition frames which are from a first to an n-th fingerprint acquisition frame in a preceding fingerprint acquisition cycle. Here, a valid image zone corresponding to each point light source which emits light in an n-th fingerprint acquisition frame in a subsequent fingerprint acquisition cycle can overlap with an invalid image zone corresponding to each point light source which emits light in an n-th fingerprint acquisition frame of a preceding fingerprint acquisition cycle. In this way, electric signal corresponding to fingerprints in the invalid image zones corresponding to each point light source which emits light in the n-th fingerprint acquisition frame in the preceding fingerprint acquisition cycle can be obtained. As shown in FIG. 9, TX1_2 overlaps with an invalid image zone corresponding to each point light source which emits light in the first fingerprint acquisition frame in the first fingerprint acquisition cycle. TX2_2 overlaps with an invalid image zone corresponding to each point light source which emits light in the second fingerprint acquisition frame in the first fingerprint acquisition cycle. TX3_2 overlaps with WX3_1. TX4_2 overlaps with WX4_1. Of course, setting can be done in other ways. No limit is made here.

Further, in an embodiment, a valid image zone corresponding to each point light source which emits light in an n-th fingerprint acquisition frame in a subsequent fingerprint acquisition cycle at least partially covers an invalid image zone corresponding to each point light source which emits light in an n-th fingerprint acquisition frame in a preceding fingerprint acquisition cycle. In this way, electric signal corresponding to fingerprints in the invalid image zones corresponding to each point light sources which emit light in the n-th fingerprint acquisition frame of the preceding fingerprint acquisition cycle can be obtained. For example, as shown in FIG. 8a, WX1_1 represents an invalid image zone corresponding to each point light source which emits light in a first fingerprint acquisition frame in a first fingerprint acquisition cycle. WX2_1 represents an invalid image zone corresponding to each point light source which emits light in a second fingerprint acquisition frame in the first fingerprint acquisition cycle. Here, TX1_2 partially covers WX1_1. TX2_2 partially covers WX2_1. Of course, the valid image zone corresponding to each point light source which emits light in the n-th fingerprint acquisition frame in the subsequent fingerprint acquisition cycle may completely cover the invalid image zone corresponding to each point light source which emits light in the n-th fingerprint acquisition frame in the preceding fingerprint acquisition cycle. No limit is made here.

In an embodiment, a valid image zone corresponding to each point light source which emits light in an n-th fingerprint acquisition frame in a subsequent fingerprint acquisition cycle may at least partially cover a residual image zone corresponding to each point light source which emits light in an n-th fingerprint acquisition frame in a preceding fingerprint acquisition cycle. As shown in FIG. 8a, CY1_1 represents a residual image zone corresponding to each point light source which emits light in a first fingerprint acquisition frame in a first fingerprint acquisition cycle. CY2_1 represents a residual image zone corresponding to each point light source which emits light in a second fingerprint acquisition frame in the first fingerprint acquisition cycle. Here, TX1_2 completely covers CY1_1. TX2_2 completely covers CY2_1. Of course, a valid image zone corresponding to each point light source which emits light in an n-th fingerprint acquisition frame in a subsequent fingerprint acquisition cycle may also partially cover a residual image zone corresponding to each point light source which emits light in an n-th fingerprint acquisition frame in a preceding fingerprint acquisition cycle. No limit is made here. In this way, a valid image zone corresponding to point light sources which emit light in a first fingerprint acquisition frame in a subsequent fingerprint acquisition cycle may partially or completely cover a residual image zone corresponding to point light sources which emit light in a first fingerprint acquisition frame in a preceding fingerprint acquisition cycle. In this way, electric signal in the residual image zone which are not obtained in the first fingerprint acquisition frame in the preceding fingerprint acquisition cycle can be obtained. Then, in a second fingerprint acquisition frame, a valid image zone corresponding to point light sources which emit light in the second fingerprint acquisition frame may partially or completely cover a residual image zone corresponding to point light sources which emit light in a second fingerprint acquisition frame in the preceding fingerprint acquisition cycle. In this way, electric signal in the residual image zone which are not obtained in the second fingerprint acquisition frame in the preceding fingerprint acquisition cycle can be obtained. Then, the rest is carried out similarly, until all fingerprint acquisition cycles are completed, and electric signal corresponding to the fingerprints of a finger are all obtained. No redundant description is given here. In addition, as to n-th fingerprint in each fingerprint acquisition cycle, because the sustaining time length of current fingerprint acquisition cycle meets the preset residual image fading period, a residual image of an image sensor which receive light of a residual image zone in a preceding fingerprint acquisition cycle can be regarded already eliminated, and a subsequent fingerprint acquisition cycle starts. Thus, influence of a residual image of an image sensor in an n-th fingerprint acquisition frame on electric signal may be avoided, so that accuracy of electric signal generated by the image sensor is improved. Further, accuracy of fingerprints acquired is improved, effectiveness of fingerprint recognition is improved.

In an embodiment of the present invention, a valid image zone corresponding to each point light source which emits light in an n-th fingerprint acquisition frame in a subsequent fingerprint acquisition cycle may satisfy condition that it does not overlap with a residual image zone corresponding to each point light source which emits light in fingerprint acquisition frames which are from (n+1)th fingerprint acquisition frame to N-th fingerprint acquisition frame in a preceding fingerprint acquisition cycle. Here, a valid image zone corresponding to each point light source which emits light in an n-th fingerprint acquisition frame in a subsequent fingerprint acquisition cycle completely covers or partially covers an invalid image zone corresponding to each point light source which emits light in an n-th fingerprint acquisition frame in a preceding fingerprint acquisition cycle. No limit is made here. Take an example that a fingerprint acquisition cycle includes four fingerprint acquisition frames (namely, first to fourth fingerprint acquisition frames), as shown in FIG. 9. TX1_2 partially covers an invalid image zone corresponding to point light sources which emit light in the first fingerprint acquisition frame in a first fingerprint acquisition cycle. In addition, TX1_2 does not overlap with a residual image zone corresponding to the point light sources which emit light in second to fourth fingerprint acquisition frames in the first fingerprint acquisition cycle. The rest is carried out similarly. No redundant description is given here.

In an embodiment, fingerprint input stage is used for inputting a new fingerprint into the fingerprint recognition apparatus for fingerprint recognition. In addition, every time when a new fingerprint is input, working process of the fingerprint input stage can be carried out. In an embodiment of the present invention, in the fingerprint input stage, after all fingerprint acquisition cycles are completed, the following can be further comprised:

According to each electric signal obtained within each fingerprint acquisition cycle, a complete image of the fingerprints of a finger is determined;

Image characteristics corresponding to multiple fingerprint characteristic points are extracted from the complete image and stored in a fingerprint database. In this way, the fingerprints determined in the fingerprint input stage can be stored in the fingerprint database so as to carry out fingerprint recognition.

Further, in order to achieve fingerprint recognition function, in an embodiment, the driving method may further comprise: fingerprint recognition stage which may comprise at least one fingerprint recognition cycle.

In a current fingerprint recognition cycle, a plurality of point light sources in a finger touching zone are controlled to emit light. In addition, when the point light sources emit light, at least electric signal generated by each image sensor in the finger touching zone is obtained. In an embodiment, electrical signal generated by all image sensors in the fingerprint recognition apparatus may be obtained. In another embodiment, only electric signal generated by each image sensor in the finger touching zone may be obtained, so that time for obtaining electric signal can be shortened. In order to determine the finger touching zone, in an embodiment, at the beginning of a first fingerprint recognition cycle, the following can be further comprised: obtaining a finger touching zone which is touched by a finger in the fingerprint recognition apparatus.

According to electric signal obtained in the fingerprint recognition stage and a fingerprint database, fingerprint recognition is carried out.

Further, in an embodiment of the present invention, according to electric signal obtained in the fingerprint recognition stage and the fingerprint database, fingerprint recognition stage may comprise:

Based on electric signal obtained in a current fingerprint recognition cycle, image characteristics corresponding to fingerprint characteristic points of the current fingerprint is determined;

Determine whether similarity degree between the image characteristics corresponding to the fingerprint characteristic points of the current fingerprint and the image characteristics corresponding to the fingerprint characteristic points in the fingerprint database meets a preset similarity degree threshold value;

If yes, then it is determined that the current fingerprint matches the fingerprint already stored, and a subsequent fingerprint recognition stage may start; here, when determining whether the current fingerprint matches a stored fingerprint, corresponding operations, such as turning on the apparatus, can be carried out.

If not, then it is determined that the current fingerprint does not match the stored fingerprint, and a subsequent fingerprint recognition cycle may start.

When fingerprint recognition is carried out, fingerprint recognition performance can be evaluated through a false rejection rate (FRR) and a false acceptance rate (FAR). In an embodiment, a preset similarity degree threshold value may comprise: $FRR<1/50000$ and $FAR<2\%$. Of course, different application environments have different requirements for the similarity degree threshold value. Therefore, in a practical application, the preset similarity degree threshold value may be determined according to actual application environment. No limit is made here. In this way, when similarity degree between image characteristics corresponding to the fingerprint characteristic points of the current fingerprint and image characteristics corresponding to the fingerprint characteristic points in the fingerprint database does not meet the preset similarity degree threshold value, it may indicate that the current fingerprint does not match the stored fingerprint, the fingerprint recognition apparatus cannot be turned on right now. In this way, a subsequent fingerprint recognition cycle may start, the fingerprint recognition process is continued. When it is determined that similarity degree between the image characteristics corresponding to the fingerprint characteristic points of the current fingerprint and the image characteristics corresponding to the fingerprint characteristic points in the fingerprint database meets the preset similarity degree threshold value, it can indicate that the current fingerprint matches a stored fingerprint, then the fingerprint recognition apparatus can be turned on, so that the process of more fingerprint acquisition is not carried out. Time for fingerprint recognition can be shortened. User experience for fingerprint recognition can be improved.

In an embodiment of the present invention, a fingerprint recognition cycle can be divided into consecutive fingerprint recognition frames that include at least one fingerprint recognition frame. In various embodiments, the fingerprint recognition cycle may be divided into one, two, three, four or six consecutive fingerprint recognition frames. Of course, different application environments have different requirements on the number of the fingerprint recognition frames. Therefore, the number of the fingerprint recognition frames can be determined by design according to actual application environment. It is not restricted by the examples given here.

In an embodiment of the present invention, in a current fingerprint recognition cycle, at most part of the point light sources in a finger touching zone may be controlled to emit light. The process may comprise: in each fingerprint recognition frame in the current fingerprint recognition cycle, respectively control a plurality of point light sources in the finger touching zone to emit light, and electric signal generated by each image sensor in the finger touching zone is obtained in each fingerprint recognition frame. That is, in a same fingerprint recognition cycle, point light sources controlled to emit light in different fingerprint recognition frames are different. Further, point light sources controlled to emit light in different fingerprint recognition cycles are different. That is, point light sources controlled to emit light in each fingerprint recognition frame are different. In this way, obtaining different fingerprint electrical signals can be realized.

Figure 10:
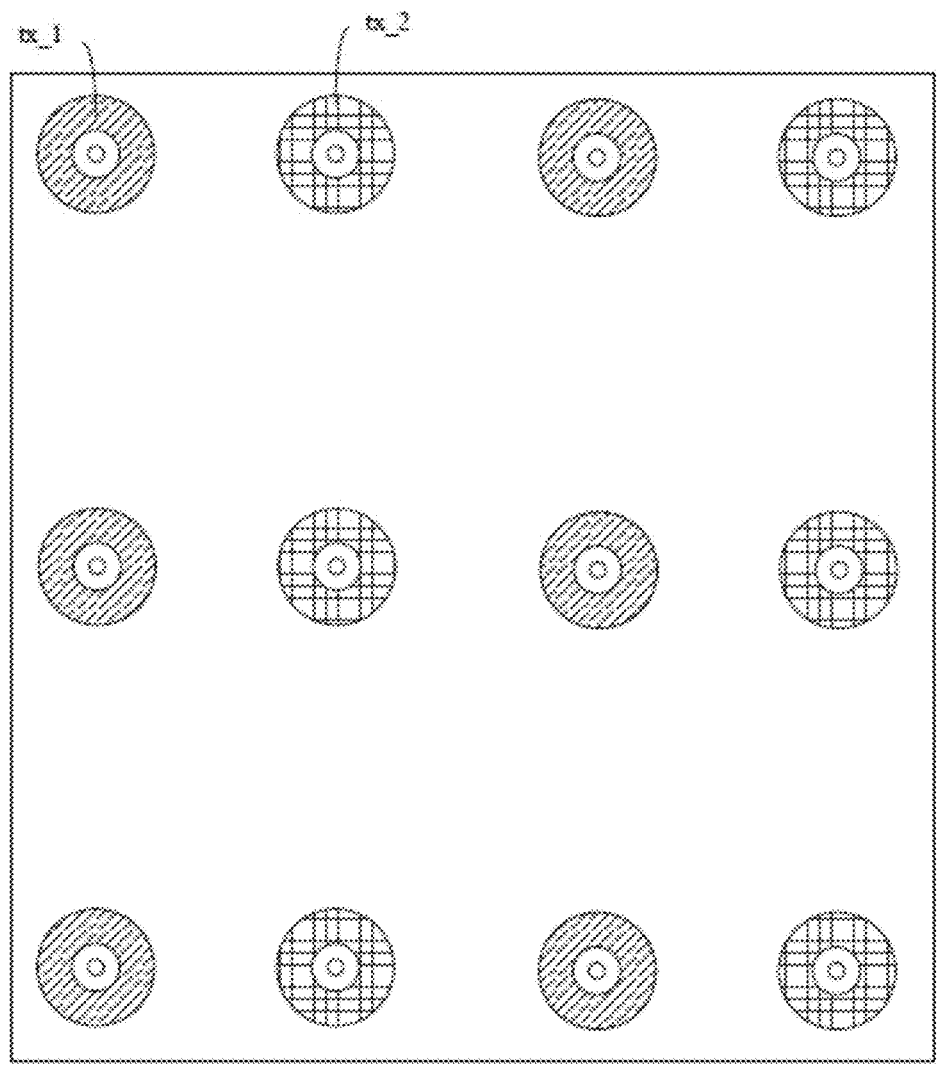
FIG. 10 schematically shows a diagram 4 of imaging zones according to an embodiment of the present invention.

In an embodiment, a fingerprint recognition cycle can be divided into at least two consecutive fingerprint recognition frames. In an embodiment of the present invention, in a same fingerprint recognition cycle, a valid image zone corresponding to point light sources which emit light in a preceding fingerprint recognition frame meets the condition that it doesn't overlap with a valid image zone corresponding to point light sources which emit light in a subsequent fingerprint recognition frame. In an embodiment, in a same fingerprint recognition cycle, a valid image zone corresponding to point light sources which emit light in a preceding fingerprint recognition frame is separated from a valid image zone corresponding to point light sources which emit light in a subsequent fingerprint recognition frame by a certain distance. For example, a fingerprint recognition cycle is divided into two consecutive fingerprint recognition frames (namely a first fingerprint recognition frame and a second fingerprint recognition frame), as shown in FIG. 10. tx_1 represents a valid image zone corresponding to each point light source which emits light in the first fingerprint recognition frame. tx_2 represents a valid image zone corresponding to each point light source which emits light in the second fingerprint recognition frame. Here, tx_1 and tx_2 are separated by a certain distance. In another embodiment, in a same fingerprint recognition cycle, a valid image zone corresponding to point light sources which emit light in a preceding fingerprint recognition frame satisfies the condition that it is tangent to a valid image zone corresponding to point light sources which emit light in a subsequent fingerprint recognition frame. It is not restricted by the examples given here.

In an embodiment, a plurality of capacitive touch control electrodes located on a substrate are further arranged in a fingerprint recognition apparatus. In an embodiment of the present invention, obtaining a finger touching zone touched by a finger in a fingerprint recognition apparatus may comprise:

obtaining a change of capacitance value corresponding to each capacitive touch control electrode in the fingerprint recognition apparatus; and determining the finger touching zone based on the change of the capacitance value.

Further, an embodiment, the fingerprint recognition apparatus can also be used as a display apparatus—to display an image. In an embodiment of the present invention, the driving method can further comprise a display stage. In the display stage, the fingerprint recognition apparatus can be driven to carry out image display. Further, the fingerprint touch zone can be a zone touched by a finger in a display zone of the fingerprint recognition apparatus. In fingerprint input stage and fingerprint recognition stage, sub-pixels in the finger touching zone may be used as point light sources to emit light, so that fingerprint acquisition is carried out. Pixel units in the display zone except the finger touching zone can be used for image display.

Further, in an embodiment of the present invention, as shown in FIG. 7a to FIG. 7c, as to multiple point light sources which emit light simultaneously, any two point light sources can be separated by at least one sub-pixel. In an embodiment, any two point light sources can be separated by one sub-pixel. Or, any two point light sources can be separated by all sub-pixels in a pixel. Or, any two point light sources can be separated by all sub-pixels in a plurality of pixel units.

Figure 11:
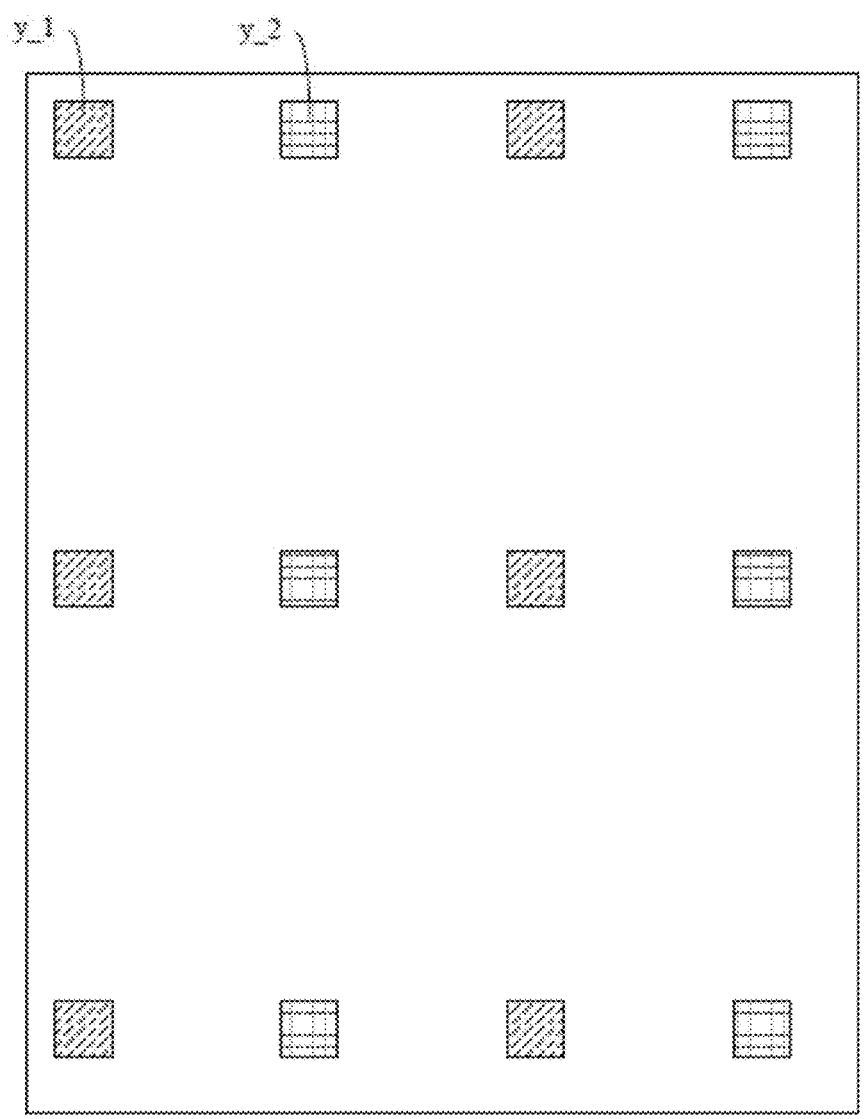
FIG. 11 schematically shows a structural diagram 4 of point light sources according to an embodiment of the present invention.

Because a fingerprint image formed on an image sensor is an amplified image, when multiple point light sources are relatively close, a same image sensor can receive light emitted by the multiple point light sources and reflected by an interface, so that precision of fingerprint acquisition is influenced. In an embodiment, as to multiple point light sources which emit light simultaneously, the number of the sub-pixels separating any two adjacent point light sources which emit light simultaneously can satisfy the condition that the valid image zones corresponding to the two point light sources do not overlap with each other. Here, the number of sub-pixels separating any two adjacent point light sources which emit light simultaneously satisfies condition that the valid image zones corresponding to the two point light sources are tangent to each other. Or, the number of the sub-pixels separating any two point light sources satisfies condition that the valid image zones corresponding to the two point light sources are separated by a certain distance. In an embodiment, as shown in FIG. 10 and FIG. 11, y_1 represents each point light source which emits light in a first fingerprint recognition frame. y_2 represents each point light source which emits light in a second fingerprint recognition frame. tx_1 represents a valid image zone corresponding to each point light source y_1 which emits light in the first fingerprint recognition frame. tx_2 represents a valid image zone corresponding to each point light source y_2 which emits light in the second fingerprint recognition frame. Here, through setting the number of sub-pixels separating any two adjacent point light sources which emit light, the condition that the valid image zones corresponding to the two point light sources are separated by a certain distance is satisfied. Of course, in practical application, the above number of the sub-pixels separating any two adjacent point light sources which emit light simultaneously, can be determined by design according to actual application environment. It is not restricted by the examples given here.

In an embodiment, as shown in FIG. 11, a plurality of point light source which emit light simultaneously may be arranged in an array. For example, all point light sources y_1 are arranged in an array, all point light source y_2 are arranged in an array.

Figure 12:
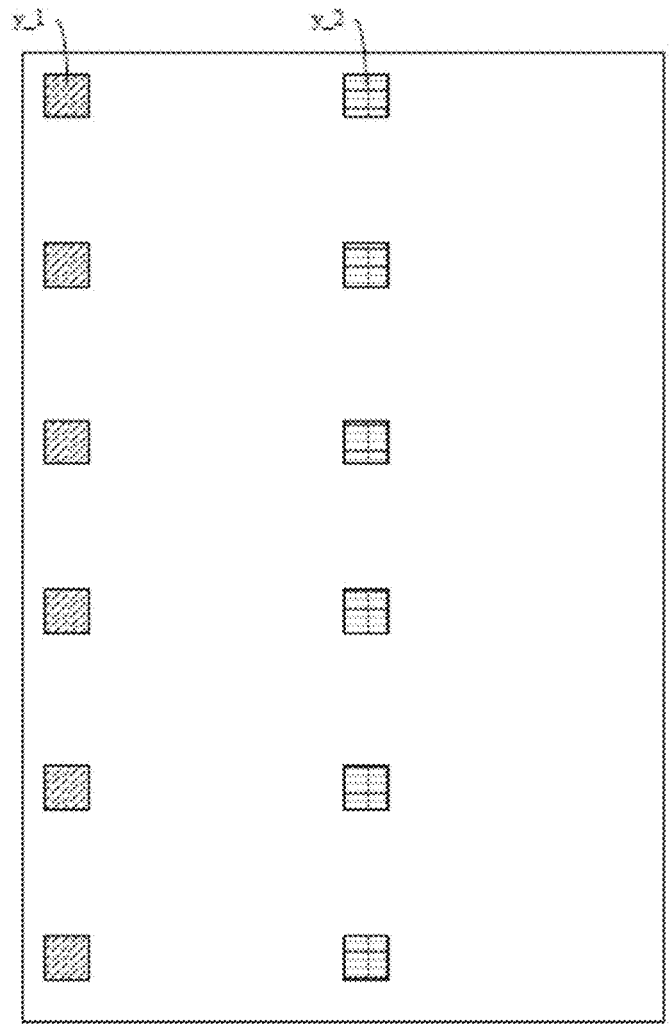
FIG. 12 schematically shows a structural diagram 5 of point light sources according to an embodiment of the present invention.

In another embodiment, as shown in FIG. 12, at least two point light sources may form a point light source group. A plurality of point light sources which emit light simultaneously can be divided into a plurality of point light source groups. In one point light source group, the centers of the zones where the point light sources are located are connected in sequence to form a strip shape. For example, all point light source y_1 form a strip shape, all point light source y_2 form a strip shape.

Figure 13:
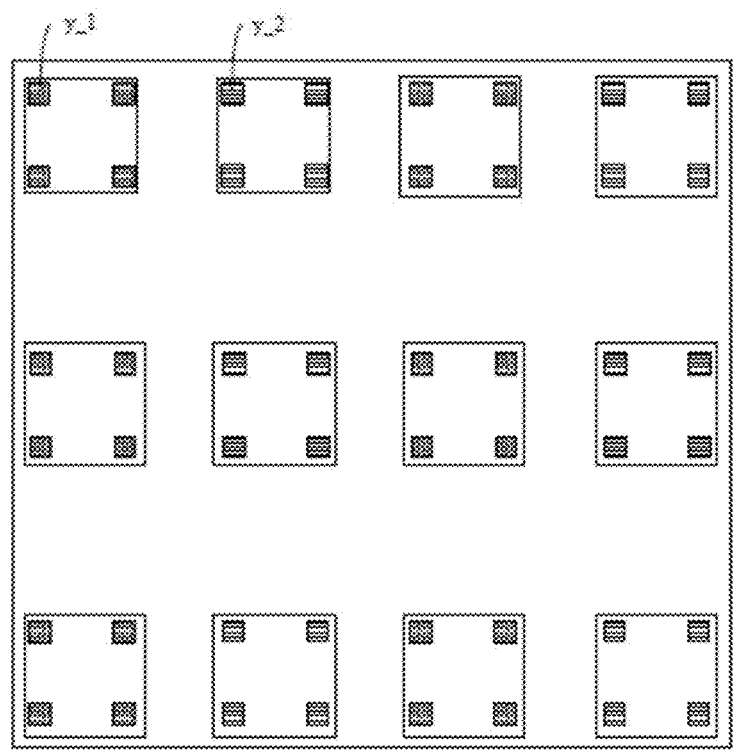
FIG. 13 schematically shows a structural diagram 6 of point light sources according to an embodiment of the present invention.
Figure 14:
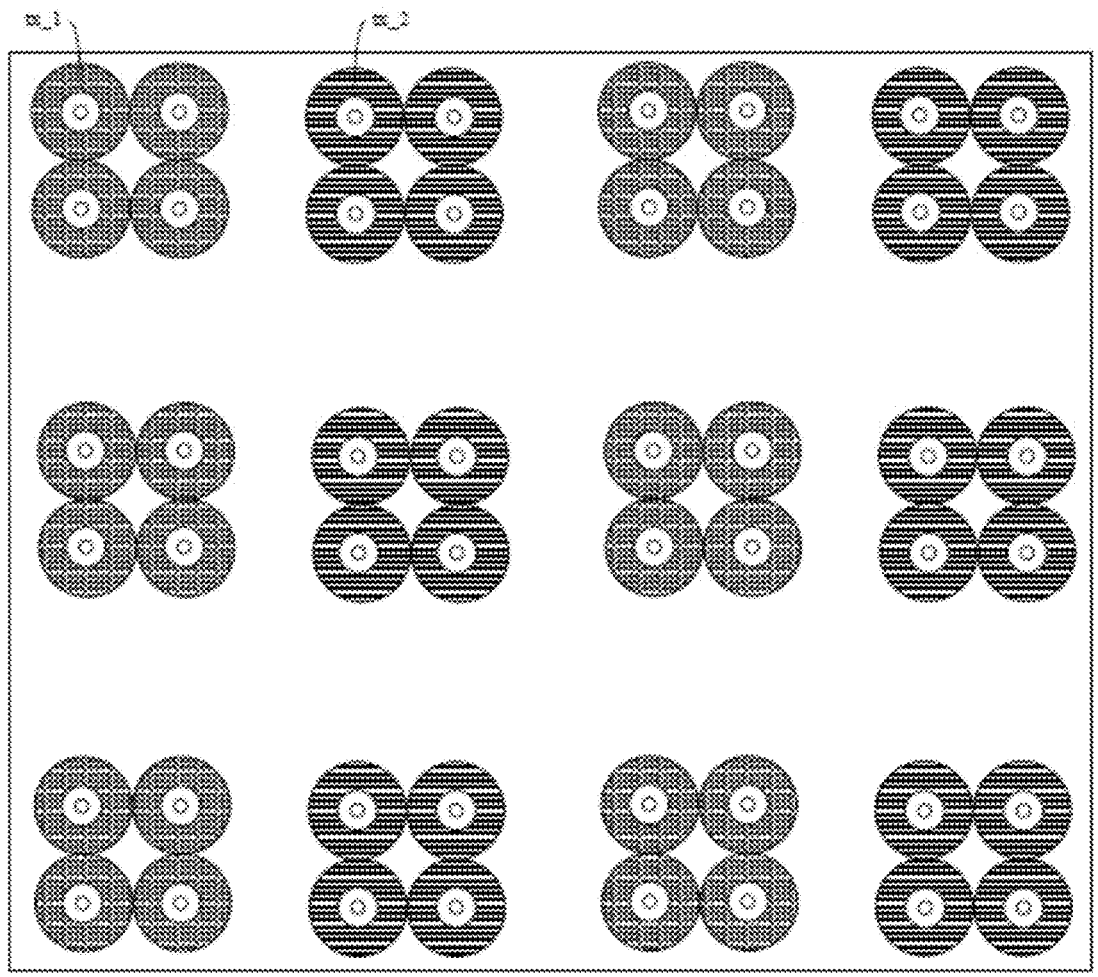
FIG. 14 schematically shows a diagram 5 of imaging zones according to an embodiment of the present invention.

Or, as shown in FIG. 13, at least three point light sources may form a point light source group. A plurality of point light sources which emit light simultaneously are divided into a plurality of point light source groups. In one point light source group, the centers of the zones where the point light sources are located are connected in sequence to form a closed graph. Further, the closed graph can be set as a regular polygon or a circle. Here, the regular polygon can be a regular quadrilateral, a regular pentagon, a regular hexagon, a regular heptagon, or a regular octagon, etc. No limit is made here. For example, as shown in FIG. 13, four point light sources y_1 form a square, four point light sources y_2 form a square. Further, as shown in FIG. 13 and FIG. 14, y_1 represents each point light source which emits light in a first fingerprint recognition frame. y_2 represents each point light source which emits light in a second fingerprint recognition frame. tx_1 represents a valid image zone corresponding to each point light source y_1 which emits light in the first fingerprint recognition frame. tx_2 represents a valid image zone corresponding to each point light source y_2 which emits light in the second fingerprint recognition frame. In one point light source group, the valid image zones corresponding to two adjacent point light sources can satisfy the condition that they are tangent to each other.

Figure 15A:
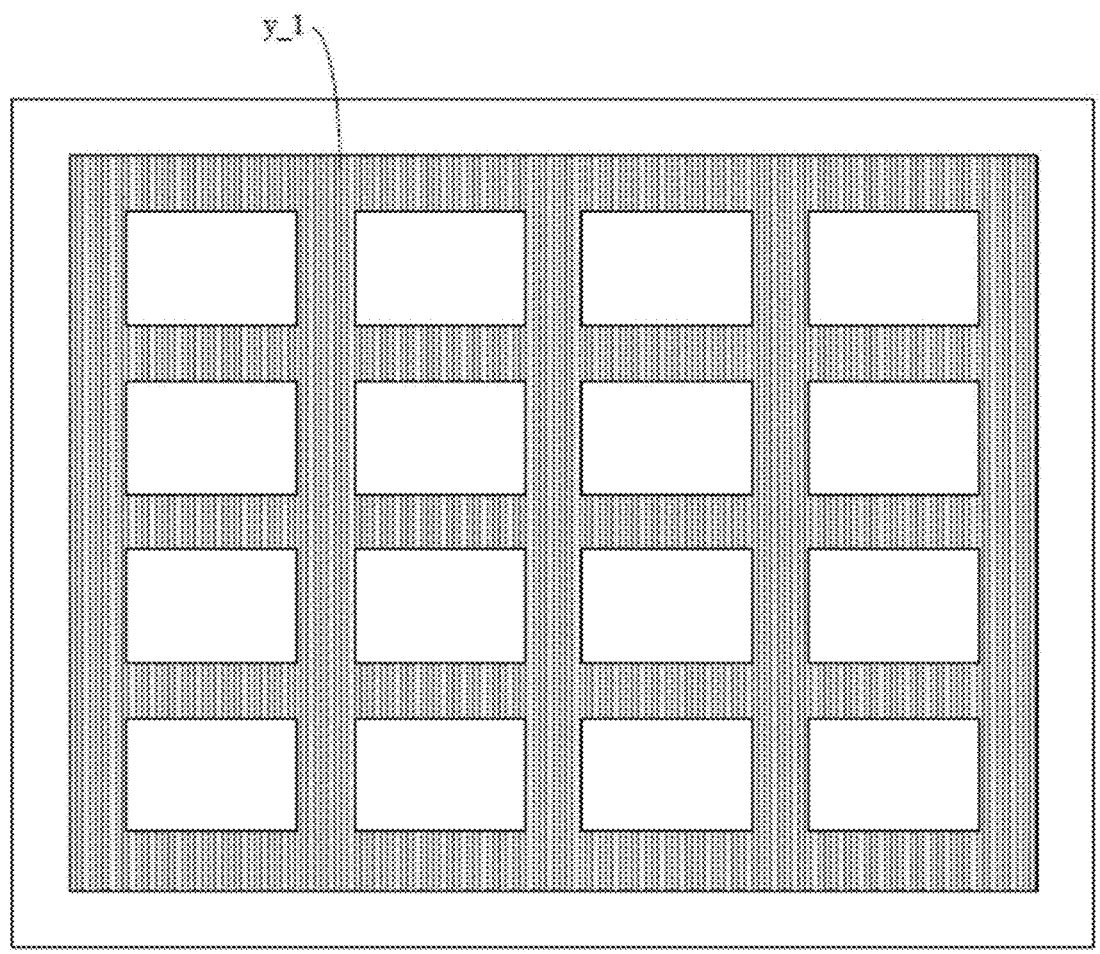
FIG. 15a schematically shows a structural diagram 7 of point light sources according to an embodiment of the present invention.
Figure 15B:
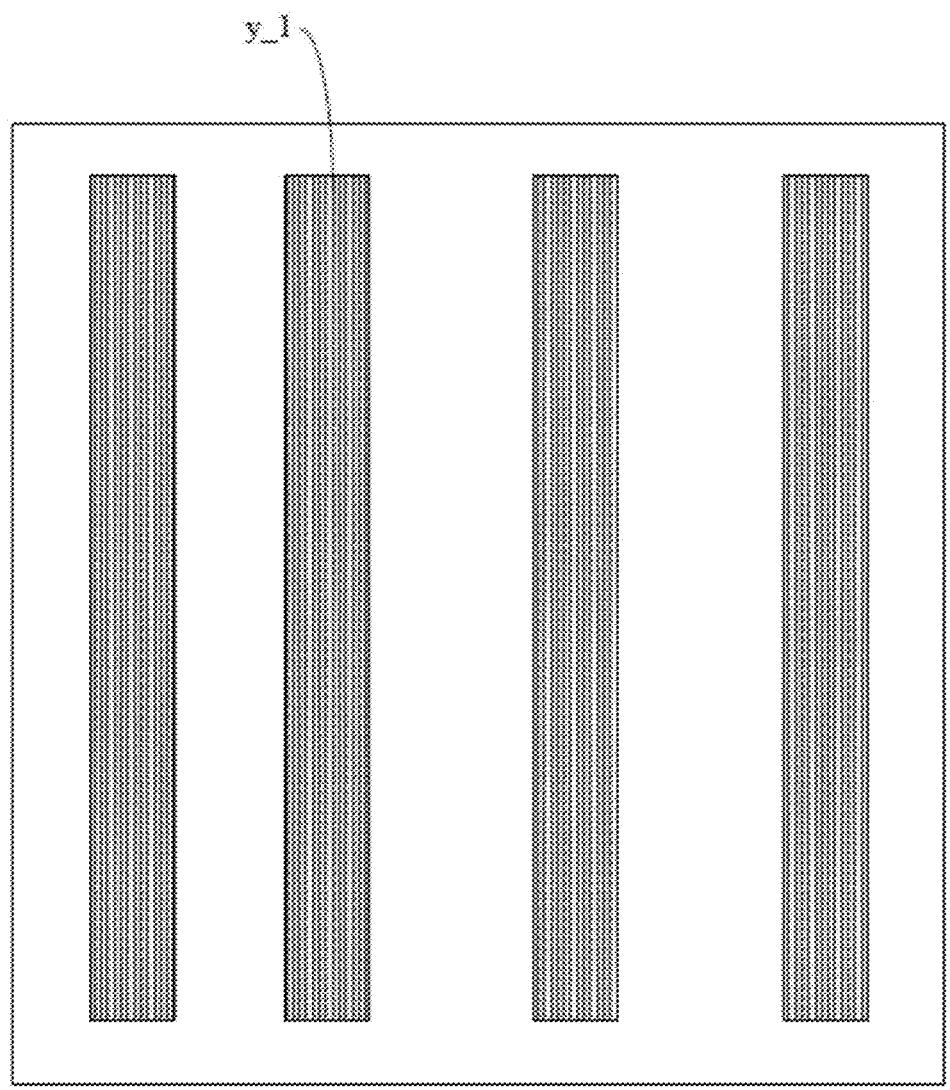
FIG. 15b schematically shows a structural diagram 8 of point light sources according to an embodiment of the present invention.

In an embodiment, as shown in FIG. 15a, a plurality of point light sources y_1 which emit light simultaneously can form a grid pattern. Here, the grid pattern (namely, a shadow area in FIG. 15a) may include a plurality of point light sources which form a line shape. Of course, in various embodiments, the grid pattern can be determined by design according to actual application environment. No limit is made here. Further, the grid patterns may also include a polygon or a circle. Here, the polygon can be a regular quadrilateral, a regular pentagon, a regular hexagon, a regular heptagon, or a regular octagon, etc. No limit is made here. Or, as shown in FIG. 15b, a plurality of point light sources y_1 which emit light simultaneously can form a bar pattern. Of course, a plurality of point light sources which emit light simultaneously can also form a grid pattern and a bar pattern. No limit is made here.

It should be noted that the above setting mode of point light sources is suitable for a fingerprint acquisition in at least one of fingerprint input stage and fingerprint recognition stage. In addition, different application environments have different requirements on image zones, invalid image zones and residual image zones. Therefore, embodiments of point light sources can be designed according to above condition and actual application environment. No limit is made here.

One driving method according to an embodiment is described with reference to FIG. 7a, FIG. 9, FIG. 13 and FIG. 14. The driving method according to an embodiment may comprise the following steps:

(1) in a first fingerprint acquisition frame in a first fingerprint acquisition cycle F1_1 in a fingerprint input stage, obtaining information of change of capacitance value corresponding to each capacitive touch control electrode in a fingerprint recognition apparatus; according to the information of change of the capacitance value, after the finger touching zone is determined, controlling each point light source Y1_1 to emit light simultaneously, and obtaining electrical signal generated by each image sensor in the finger touching zone.

(2) in a second fingerprint acquisition frame in a first fingerprint acquisition cycle F2_1, controlling each point light source Y2_1 to emit light simultaneously, and obtaining electrical signal generated by each image sensor in the finger touching zone.

(3) in a third fingerprint acquisition frame in a first fingerprint acquisition cycle F3_1, controlling each point light source Y3_1 to emit light simultaneously, and obtaining electrical signal generated by each image sensor in the finger touching zone.

(4) in a fourth fingerprint acquisition frame in a first fingerprint acquisition cycle F4_1, controlling each point light source Y4_1 to emit light simultaneously, and obtaining electric signal generated by each image sensor in the finger touching zone. Then, the rest is carried out in a way similar to step (1)-(4), until when the sustaining time length of the current fingerprint acquisition cycle meets the preset residual image fading period. The residual images on image sensors which work in a first fingerprint acquisition frame F1_1 can be regarded already eliminated. Thereafter, a subsequent fingerprint acquisition cycle may start, namely, a second fingerprint acquisition cycle.

(5) in a first fingerprint acquisition frame F1_2 of a second fingerprint acquisition cycle, controlling each point light source Y1_2 to emit light simultaneously, and obtaining electric signal generated by each image sensor in the finger touching zone. In this way, electric signal of image sensors corresponding to a residual image zone in a first fingerprint acquisition frame F1_1 can be obtained. Thus, based on the obtained electric signal, the missing part of the fingerprint image in the first fingerprint acquisition frame F1_1 is made up.

(6) in a second fingerprint acquisition frame F2_2 in a second fingerprint acquisition cycle, controlling each point light source Y2_2 to emit light simultaneously, and obtaining electric signal generated by each image sensor in the finger touching zone. In this way, the missing part in the fingerprint image obtained in a second fingerprint acquisition frame F2_1 can be partially made up.

(7) in a third fingerprint acquisition frame F3_2 in a second fingerprint acquisition cycle, controlling each point light source Y3_2 to emit light simultaneously, and obtaining electric signal generated by each image sensor in the finger touching zone. In this way, a missing part in the fingerprint image obtained in a third fingerprint acquisition frame F3_1 can be made up.

(8) in a fourth fingerprint acquisition frame in a second fingerprint acquisition cycle F4_2, controlling each point light source Y4_2 to emit light simultaneously, and obtaining electric signal generated by each image sensor in the finger touching zone. In this way, a missing part in the fingerprint image obtained in a fourth fingerprint acquisition frame F4_1 can be made up.

Then, the rest is carried out in a way similar to step (1)-(8), until all fingerprint acquisition cycles are completed, so that electric signals corresponding to the fingerprints of a finger are all obtained.

(9) based on the electric signals obtained in the fingerprint acquisition cycles, a complete image of the fingerprints of the finger is determined. For example, a complete image of the fingerprints of the finger may be determined by using a stitching method.

(10) extracting image characteristics corresponding to a plurality of fingerprint characteristic points from a complete image and storing them into a fingerprint database.

(11) in a fingerprint recognition stage, in a fingerprint recognition frame SZ_1 in a first fingerprint recognition cycle, obtaining information of change of capacitance value corresponding to each capacitive touch control electrode in a fingerprint recognition apparatus; based on the information of change of the capacitance value, after the finger touching zone is determined, each point light source y_1 is controlled to emit light simultaneously, and obtaining electrical signal generated by each image sensor in the finger touching zone.

(12) then, entering into a fingerprint recognition frame SZ_2. In the fingerprint recognition frame SZ_2, controlling each point light source Y_2 to emit light simultaneously, and obtaining electrical signal generated by each image sensor in the finger touching zone.

(13) based on electric signals obtained in the fingerprint recognition frames SZ_1 and SZ_2, determining image characteristics corresponding to fingerprint characteristic points of the current fingerprint.

(14) determining whether similarity degree between image characteristics corresponding to fingerprint characteristic points in a first fingerprint recognition cycle and image characteristics corresponding to fingerprint characteristic points stored in the fingerprint database meets a preset similarity degree threshold value. If yes, then, step (15) is executed; if not, then step (16) is executed.

(15) it is determined that the current fingerprint matches the stored fingerprint, then, the fingerprint recognition apparatus can be turned on and a subsequent fingerprint recognition stage may start.

(16) It is determined that the current fingerprint does not match the stored fingerprint. Then, the fingerprint recognition apparatus cannot be turned on. A subsequent fingerprint recognition cycle is entered into to carry out fingerprint acquisition again, until it is determined that the current fingerprint matches the stored fingerprint, or until the fingerprint recognition stage is ended.

Figure 16:
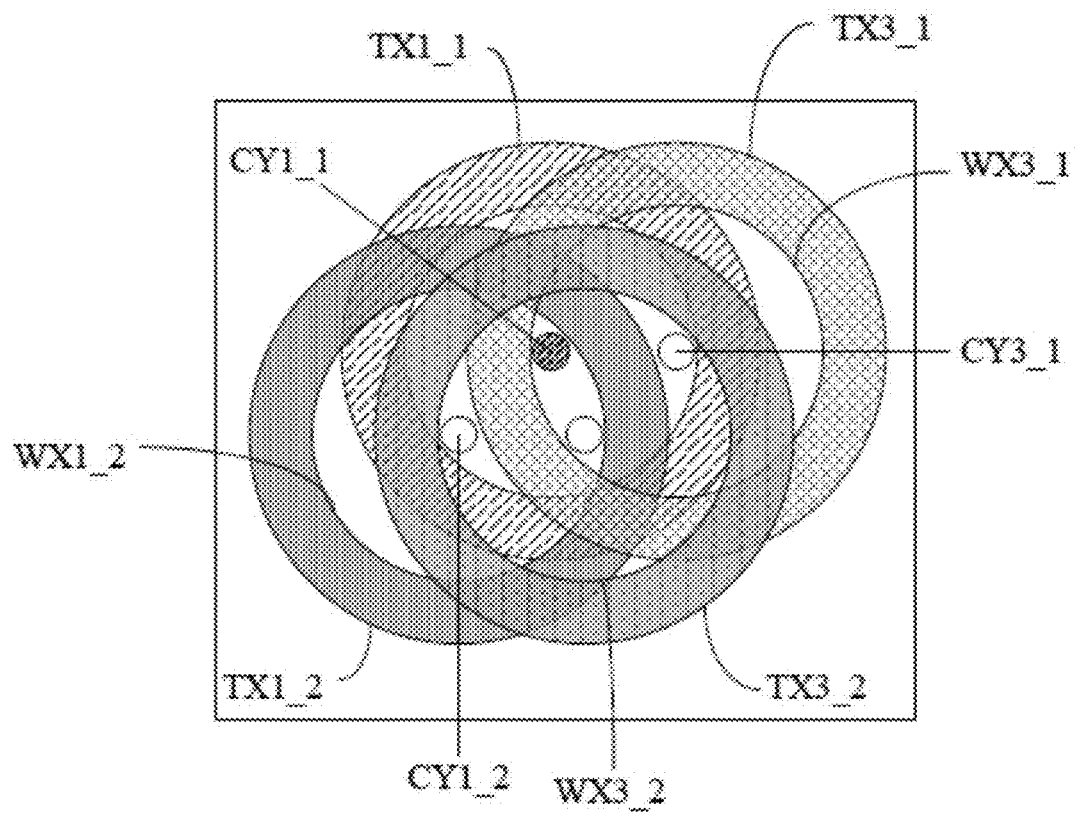
FIG. 16 schematically shows a diagram 6 of imaging zones according to an embodiment of the present invention.

A structural diagram of a display panel corresponding to another embodiment is shown in FIG. 7a and FIG. 16, with variation different from the fingerprint acquisition cycle in the previous embodiment. Only difference between this embodiment and the previous embodiment is described below. The same part is not redundantly described here.

In an embodiment of the present invention, an invalid image zone corresponding to each point light source in an n-th fingerprint acquisition frame in a subsequent fingerprint acquisition cycle can cover a residual image zone corresponding to each point light source in an n-th fingerprint acquisition frame in a preceding fingerprint acquisition cycle. Thus, influence of the residual image zone on accuracy of fingerprints acquired can be further avoided.

Take an example that a fingerprint acquisition cycle includes four fingerprint acquisition frames (namely, first to fourth fingerprint acquisition frame), as shown in FIG. 7a and FIG. 16. Here, TX1_1 represents a valid image zone corresponding to each point light source Y1_1 which emits light in the first fingerprint acquisition frame in a first fingerprint acquisition cycle. TX3_1 represents a valid image zone corresponding to each point light source Y3_1 which emits light in the third fingerprint acquisition frame in the first fingerprint acquisition cycle. CY1_1 represents a residual image zone corresponding to each point light source Y1_1 which emits light in the first fingerprint acquisition frame in the first fingerprint acquisition cycle. WX3_1 represents an invalid image zone corresponding to each point light source Y3_1 which emits light in the third fingerprint acquisition frame in the first fingerprint acquisition cycle. CY3_1 represents a residual image zone corresponding to each point light source Y3_1 which emits light in the third fingerprint acquisition frame in the first fingerprint acquisition cycle. TX1_2 represents a valid image zone corresponding to each point light source Y1_2 which emits light in the first fingerprint acquisition frame in a second fingerprint acquisition cycle. TX3_2 represents a valid image zone corresponding to each point light source Y3_2 which emits light in the third fingerprint acquisition frame in the second fingerprint acquisition cycle. WX1_2 represents an invalid image zone corresponding to each point light source Y1_2 which emits light in the first fingerprint acquisition frame in the second fingerprint acquisition cycle. CY1_2 represents a residual image zone corresponding to each point light source Y1_2 which emits light in the first fingerprint acquisition frame in the second fingerprint acquisition cycle. WX3_2 represents an invalid image zone corresponding to each point light source Y3_2 which emits light in the third fingerprint acquisition frame in the second fingerprint acquisition cycle. Here, WX1_2 covers CY1_1. WX3_2 covers CY3_1. Further, WX3_1 covers CY1_1. WX3_2 covers CY1_2.

Figure 17:
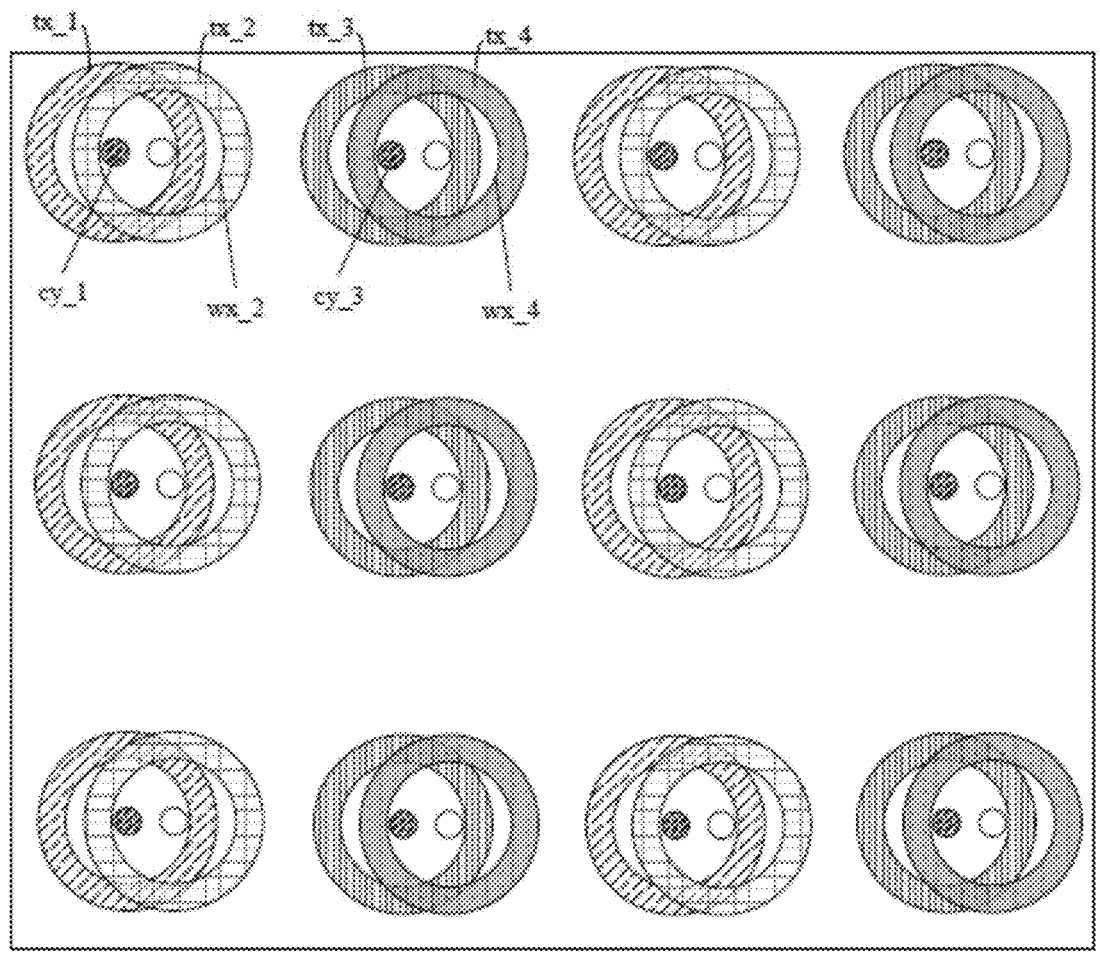
FIG. 17 schematically shows a diagram 7 of imaging zones according to an embodiment of the present invention.

A structural diagram of a display panel corresponding to another embodiment is shown in FIG. 17, with variation for the implementation manner of the fingerprint recognition cycle in the previous embodiment. Only difference between this embodiment and the previous embodiment is described below. The same part is not redundantly described here.

In an embodiment of the present invention, a fingerprint recognition cycle can be divided into at least two consecutive fingerprint recognition frames. Here, two adjacent fingerprint recognition frames may form a recognition frame group. At least two consecutive fingerprint recognition frames may be divided into X consecutive recognition frame groups; here, in a same recognition frame group, an invalid image zone corresponding to point light sources which emit light in a subsequent fingerprint recognition frame covers a residual image zone corresponding to point light sources which emit light in a preceding fingerprint recognition frame. X is an integer larger than or equal to 1.

Further, in an embodiment of the present invention, in one fingerprint recognition cycle, a valid image zone corresponding to each point light source which emits light in a subsequent recognition frame group satisfies the condition that it does not overlap with a valid image zone corresponding to each point light source which emits light in a preceding recognition frame group.

For example, a fingerprint recognition cycle can be divided into four consecutive fingerprint recognition frames, namely a first fingerprint recognition frame to a fourth fingerprint recognition frame. In this way, the first fingerprint recognition frame and the second fingerprint recognition frame are one recognition frame group. The third fingerprint recognition frame and the fourth fingerprint recognition frame are another recognition frame group. As shown in FIG. 17, tx_1 represents a valid image zone corresponding to each point light source which emits light in the first fingerprint recognition frame. tx_2 represents a valid image zone corresponding to each point light source which emits light in the second fingerprint recognition frame. tx_3 represents a valid image zone corresponding to each point light source which emits light in the third fingerprint recognition frame. tx_4 represents a valid image zone corresponding to each point light source which emits light in the fourth fingerprint recognition frame. cy_1 represents a residual image zone corresponding to each point light source which emits light in the first fingerprint recognition frame. wx_2 represents an invalid image zone corresponding to each point light source which emits light in the second fingerprint recognition frame. cy_3 represents a residual image zone corresponding to each point light source which emits light in the third fingerprint recognition frame. wx_4 represents an invalid image zone corresponding to each point light source in the fourth fingerprint recognition frame. Here, wx_2 covers cy_1. wx_4 covers cy_2. Neither tx_1 nor tx_2 has overlap with tx_3 or tx_4.

Figure 18:
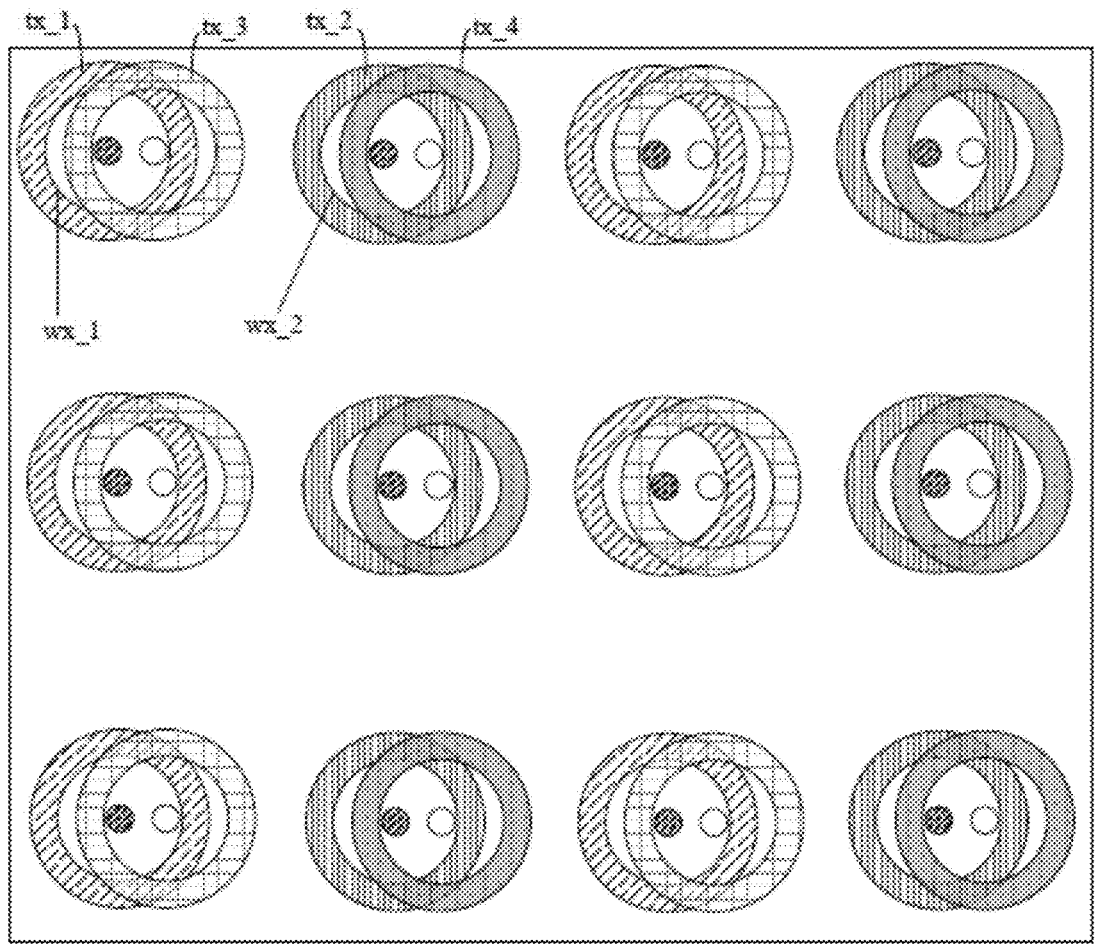
FIG. 18 schematically shows a diagram 8 of imaging zones according to an embodiment of the present invention.

A structural diagram of a display panel corresponding to another embodiment is shown in FIG. 18, with variation for the implementation manner of the fingerprint recognition cycle in the previous embodiment. Only difference between this embodiment and the previous embodiment is described below. The same part is not redundantly described here.

In an embodiment, a fingerprint recognition cycle is divided into at least three consecutive fingerprint recognition frames. In an embodiment of the present invention, in a same fingerprint recognition cycle, as to two fingerprint recognition frames which are separated by at least one fingerprint recognition frame, a valid image zone corresponding to point light sources which emit light in a subsequent fingerprint recognition frame at least partially covers an invalid image zone corresponding to point light sources which emit light in a preceding fingerprint recognition frame. Here, a fingerprint recognition cycle can be divided into four consecutive fingerprint recognition frames, namely a first fingerprint recognition frame to a fourth fingerprint recognition frame. As shown in FIG. 18, tx_1 represents a valid image zone corresponding to each point light source which emits light in the first fingerprint recognition frame. tx_2 represents a valid image zone corresponding to each point light source which emits light in the second fingerprint recognition frame. tx_3 represents a valid image zone corresponding to each point light source which emits light in the third fingerprint recognition frame. tx_4 represents a valid image zone corresponding to each point light source which emits light in the fourth fingerprint recognition frame. wx_1 represents an invalid image zone corresponding to each point light source which emits light in the first fingerprint recognition frame. wx_2 represents an invalid image zone corresponding to each point light source which emits light in the second fingerprint recognition frame. Here, the first fingerprint recognition frame and the third fingerprint recognition frame are separated by one fingerprint recognition frame. The second fingerprint recognition frame and the fourth fingerprint recognition frame are separated by one fingerprint recognition frame. tx_3 partially covers wx_1. tx_4 partially covers wx_2. Of course, a valid image zone corresponding to point light sources which emit light in a subsequent fingerprint recognition frame can cover an invalid image zone corresponding to point light sources which emit light in a preceding fingerprint recognition frame. No limit is made here.

Figure 19:
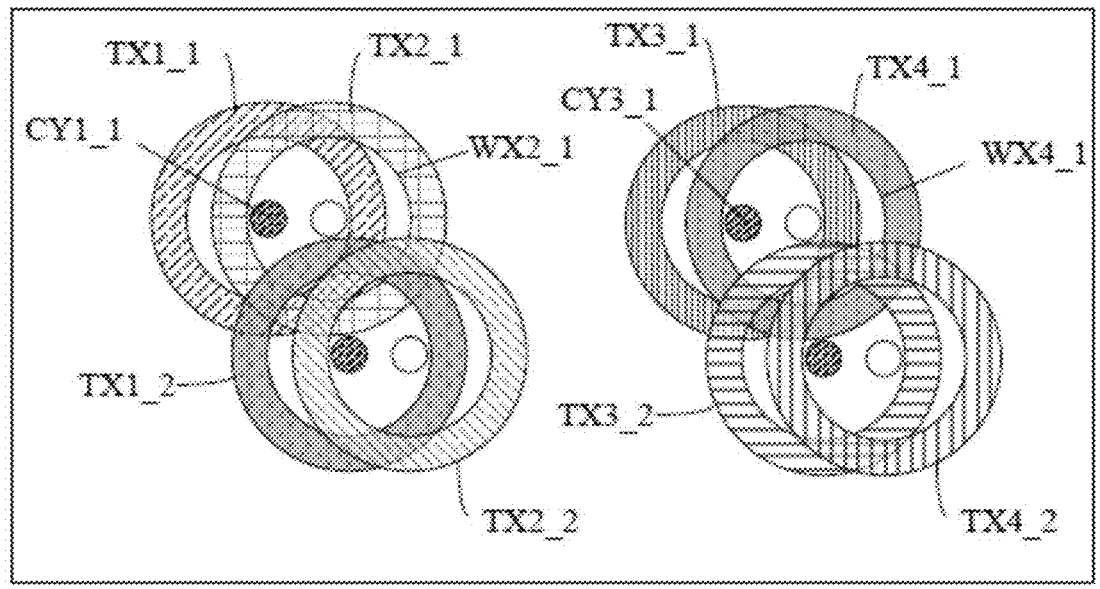
FIG. 19 schematically shows a diagram 9 of imaging zones according to an embodiment of the present invention.

A structural diagram of a display panel corresponding to another embodiment is shown in FIG. 19, with variation for the implementation manner of the fingerprint acquisition cycle in the previous embodiment. Only difference between the embodiment and the previous embodiment is described below. The same part is not redundantly described here.

In an embodiment, each fingerprint acquisition cycle includes: N consecutive fingerprint acquisition frames. In an embodiment of the present invention, two adjacent fingerprint acquisition frames are taken as an acquisition frame group. N fingerprint acquisition frames are divided into M consecutive acquisition frame groups; here, in at least one acquisition frame group, an invalid image zone corresponding to point light sources which emit light in a subsequent fingerprint acquisition frame covers a residual image zone corresponding to point light sources which emit light in a preceding fingerprint acquisition frame; in addition, a valid image zone corresponding to each point light source which emits light in an (m+1)th acquisition frame group satisfies the condition that it does not overlap with a valid image zone corresponding to each point light source which emits light in an m-th acquisition frame group; M is an integer greater than 1. m is an integer greater than or equal to 1 and less than or equal to M−1. Here, in each acquisition frame group, an invalid image zone corresponding to point light sources which emit light in a subsequent fingerprint acquisition frame can cover a residual image zone corresponding to the point light sources which emit light in a preceding fingerprint acquisition frame. No limit is made here.

Take an example that each fingerprint acquisition cycle includes four consecutive fingerprint acquisition frames (namely, a first to a fourth fingerprint acquisition frame). The first fingerprint acquisition frame and the second fingerprint acquisition frame are a first acquisition frame group. The third fingerprint acquisition frame and the fourth fingerprint acquisition frame are a second acquisition frame group. As shown in FIG. 19, TX1_1 represents a valid image zone corresponding to a point light source which emits light in the first fingerprint acquisition frame in a first fingerprint acquisition cycle. TX2_1 represents a valid image zone corresponding to a point light source which emits light in the second fingerprint acquisition frame in the first fingerprint acquisition cycle. TX3_1 represents a valid image zone corresponding to a point light source which emits light in the third fingerprint acquisition frame in the first fingerprint acquisition cycle. TX4_1 represents a valid image zone corresponding to a point light source which emits light in the fourth fingerprint acquisition frame in the first fingerprint acquisition cycle. TX1_2 represents a valid image zone corresponding to a point light source which emits light in the first fingerprint acquisition frame in a second fingerprint acquisition cycle. TX2_2 represents a valid image zone corresponding to a point light source which emits light in the second fingerprint acquisition frame in the second fingerprint acquisition cycle. TX3_2 represents a valid image zone corresponding to a point light source which emits light in the third fingerprint acquisition frame in the second fingerprint acquisition cycle. TX4_2 represents a valid image zone corresponding to a point light source which emits light in the fourth fingerprint acquisition frame in the second fingerprint acquisition cycle. CY1_1 represents a residual image zone corresponding to a point light source which emits light in the first fingerprint acquisition frame in the first fingerprint acquisition cycle. CY3_1 represents a residual image zone corresponding to a point light source which emits light in the third fingerprint acquisition frame in the first fingerprint acquisition cycle. WX2_1 represents an invalid image zone corresponding to a point light source which emits light in the second fingerprint acquisition frame in the first fingerprint acquisition cycle. WX4_1 represents an invalid image zone corresponding to a point light source which emits light in the fourth fingerprint acquisition frame in the first fingerprint acquisition cycle. Here, WX2_1 covers CY1_1. WX4_1 covers CY3_1. Both TX1_1 and TX2_1 have no overlap with TX3_1 and TX4_1. Both TX1_2 and TX2_2 have no overlap with TX3_2 and TX4_2.

Further, in an embodiment of the present invention, for a preceding fingerprint acquisition frame in an m-th acquisition frame group of a subsequent fingerprint acquisition cycle and a subsequent fingerprint acquisition frame in an m-th acquisition frame group of a preceding fingerprint acquisition cycle, a valid image zone corresponding to a point light source which emits light in a preceding fingerprint acquisition frame at least partially covers an invalid image zone corresponding to a point light source which emits light in a subsequent fingerprint acquisition frame. With reference to FIG. 19, when m=1, a preceding fingerprint acquisition frame in a first acquisition frame group of a subsequent fingerprint acquisition cycle is a first fingerprint acquisition frame of a second fingerprint acquisition cycle. A valid image zone corresponding to a point light source which emits light in that fingerprint acquisition frame is TX1_2. A subsequent fingerprint acquisition frame in a first acquisition frame group of a preceding fingerprint acquisition cycle is a second fingerprint acquisition frame of a first fingerprint acquisition cycle. An invalid image zone corresponding to a point light source which emits light in that fingerprint acquisition frame is WX2_1. Here, TX1_2 partially covers WX2_1. For same reason, when m=2, TX3_2 partially covers WX4_1.

Figure 20:
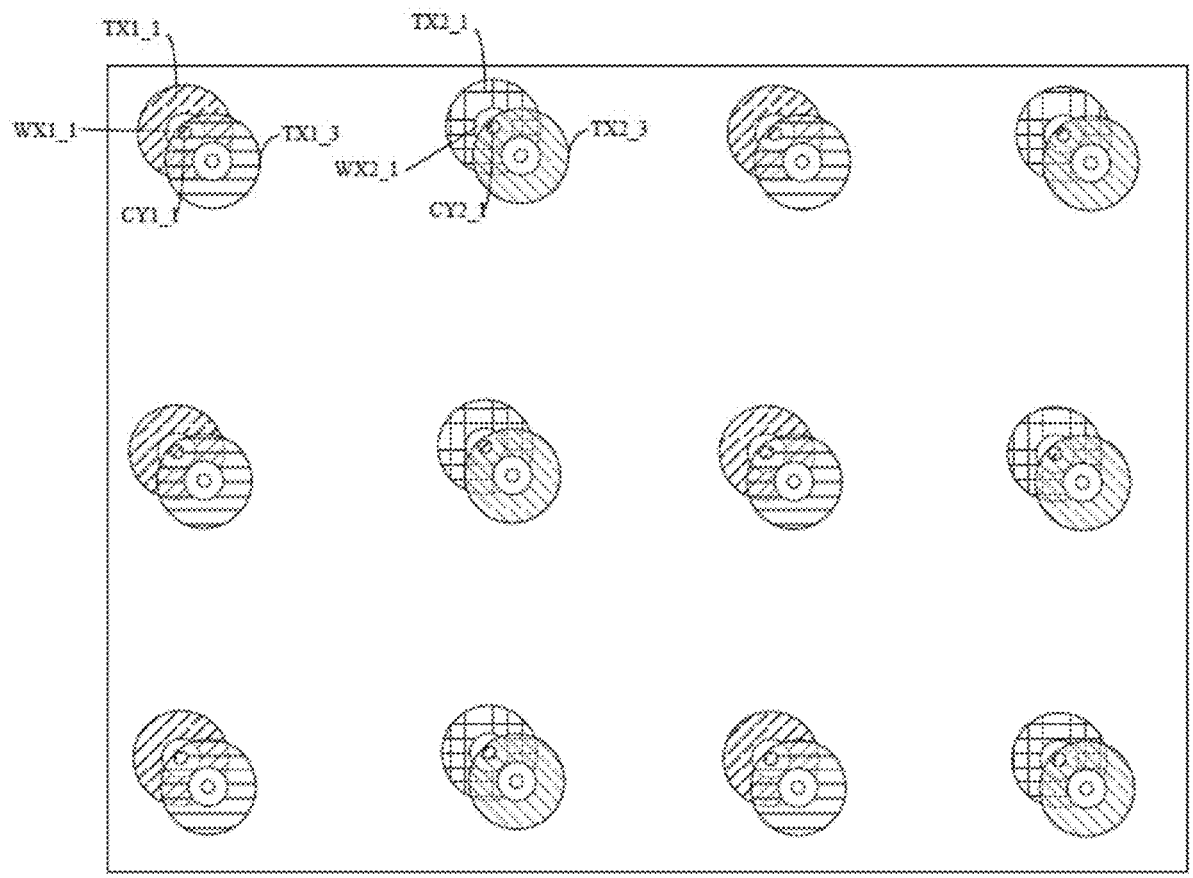
FIG. 20 schematically shows a diagram 10 of imaging zones according to an embodiment of the present invention.
Figure 21:
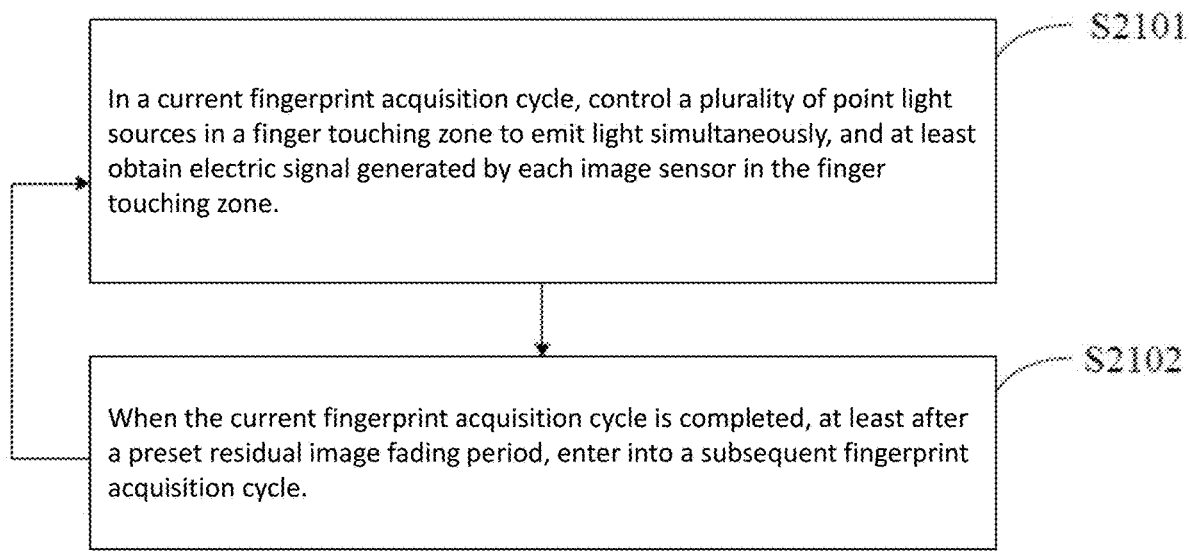
FIG. 21 is a flowchart 2 of a driving method according to an embodiment of the present invention.

A structural schematic diagram of a display panel corresponding to another embodiment is shown in FIG. 20 and FIG. 21, with variation for the implementation manner of the fingerprint acquisition cycle in the previous embodiment. Only difference between the present embodiment and the previous embodiment is described below. The same part is not redundantly described here.

In an embodiment of the present invention, for two fingerprint acquisition cycles which are separated by at least one fingerprint acquisition cycle, a valid image zone corresponding to point light sources which emit light in an n-th fingerprint acquisition frame in a subsequent fingerprint acquisition cycle overlaps with an invalid image zone corresponding to point light sources which emit light in at least one of fingerprint acquisition frames which are from the first to n-th fingerprint acquisition frame of a preceding fingerprint acquisition cycle. Here, a valid image zone corresponding to point light sources which emit light in an n-th fingerprint acquisition frame in a subsequent fingerprint acquisition cycle overlaps with an invalid image zone corresponding to point light sources which emit light in an n-th fingerprint acquisition frame in a preceding fingerprint acquisition cycle. Taking first to third fingerprint acquisition cycles as an example, a valid image zone corresponding to a point light source which emits light in an n-th fingerprint acquisition frame in the third fingerprint acquisition cycle can overlap with an invalid image zone corresponding to a point light source which emits light in an n-th fingerprint acquisition frame in the first fingerprint acquisition cycle. As shown in FIG. 20, TX1_1 represents a valid image zone corresponding to a point light source which emits light in the first fingerprint acquisition frame in the first the acquisition cycle. TX2_1 represents a valid image zone corresponding to a point light source which emits light in the second fingerprint acquisition frame in the first fingerprint acquisition cycle. TX1_3 represents a valid image zone corresponding to a point light source which emits light in the first fingerprint acquisition frame in the third fingerprint acquisition cycle. TX2_3 represents a valid image zone corresponding to a point light source which emits light in the second fingerprint acquisition frame in the third fingerprint acquisition cycle. WX1_1 represents an invalid image zone corresponding to a point light source which emits light in the first fingerprint acquisition frame in the first fingerprint acquisition cycle. WX2_1 represents an invalid image zone corresponding to a point light source which emits light in the second fingerprint acquisition frame in the first fingerprint acquisition cycle. Here, TX1_3 partially covers WX1_1. TX2_3 partially covers WX2_1. Of course, other manners can also be used for setting. No limit is made here.

In an embodiment, a valid image zone corresponding to a point light source which emits light in an n-th fingerprint acquisition frame of a subsequent fingerprint acquisition cycle can at least partially cover a residual image corresponding to a point light source which emits light in an n-th fingerprint acquisition frame of a preceding fingerprint acquisition cycle. As shown in FIG. 20, CY1_1 represents a residual image zone corresponding to a point light source which emits light in a first fingerprint acquisition frame in a first acquisition cycle. CY2_1 represents a residual image zone corresponding to a point light source which emits light in a second fingerprint acquisition frame in the first fingerprint acquisition cycle. Here, TX1_3 completely covers CY1_1. TX2_3 completely covers CY2_1. Of course, a valid image zone corresponding to a point light source which emits light in an n-th fingerprint acquisition frame of a subsequent fingerprint acquisition cycle can also partially cover a residual image zone corresponding to a point light source which emits light in an n-th fingerprint acquisition frame of a preceding fingerprint acquisition cycle. No limit is made here.

Figure 22:
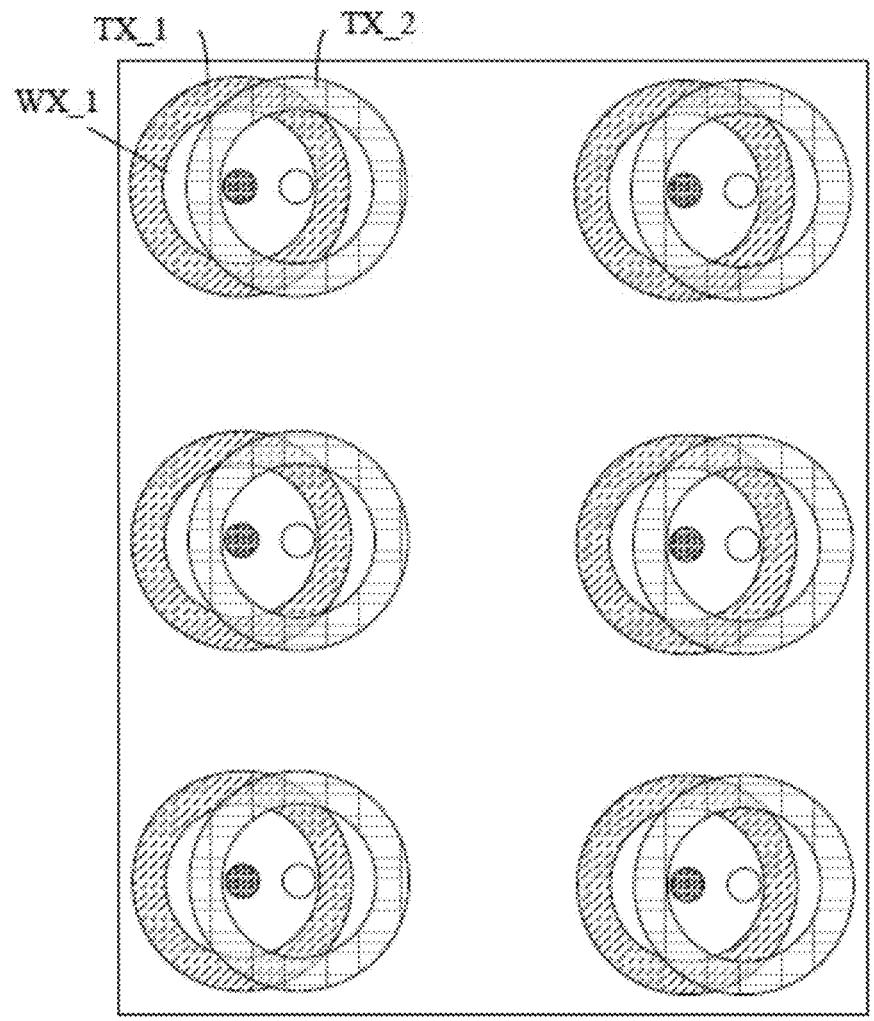
FIG. 22 schematically shows a diagram 11 of imaging zones according to an embodiment of the present invention.

A structural diagram of a display panel corresponding to another embodiment is shown in FIG. 21 and FIG. 22, with variation for the implementation manner of the fingerprint acquisition cycle in the previous embodiment. Only difference between the embodiment and the previous embodiment is described below. The same part is not redundantly described here.

In an embodiment of the present invention, as shown in FIG. 21, point light sources with a same light emitting sequence in two adjacent fingerprint acquisition cycles are controlled to emit light separated by at least a time interval of a preset residual image fading period, so that the time difference between the time when light of a valid image zone received and the time when light of a residual image zone received by a same image sensor in two adjacent fingerprint acquisition cycles is at least the preset residual image fading period. In an embodiment, the process may comprise the following steps:

S2101: in a current fingerprint acquisition cycle, controlling a plurality of point light sources in a finger touching zone to emit light simultaneously, and at least obtaining electric signal generated by each image sensor in the finger touching zone. In an embodiment, electric signal generated by all image sensors in the fingerprint recognition apparatus can be obtained. Or, only electric signal generated by each image sensor in the finger touching zone can be obtained, so that acquisition time of electric signal can be shortened. In order to determine the finger touching zone, in an embodiment, at beginning of a first fingerprint acquisition cycle may include: obtaining the finger touching zone which is touched by a finger in a fingerprint recognition apparatus. Here, in an embodiment, image sensors can be driven according to regions, so as to better obtain electrical signal of image sensors in the finger touching zone.

S2102: when a current fingerprint acquisition cycle is completed, at least after a preset residual image fading period, enter a subsequent fingerprint acquisition cycle; here, point light sources which emit light in the current fingerprint acquisition cycle and in the subsequent fingerprint acquisition cycle are different.

In an embodiment, in the current fingerprint acquisition cycle, a plurality of point light sources in a finger touching zone are controlled to emit light simultaneously. The light is reflected by action of an interface touched by a finger, to be incident on image sensors. Electric signal generated by each image sensor in the finger touching zone can be obtained through acquisition. When the current fingerprint acquisition cycle is completed, through waiting for the preset residual image fading period, a residual image on an image sensor which receives light when point light sources emit light in the current fingerprint acquisition cycle can be regarded as already eliminated, so that a subsequent fingerprint acquisition cycle may start. Therefore, influence of the residual image of the image sensor on electric signal can be avoided. Thus, accuracy of electric signal generated by the image sensor is improved. Further, accuracy of fingerprints acquired is improved, and effectiveness of fingerprint recognition is improved.

In an embodiment, patterns composed of point light sources which emit light in each fingerprint acquisition frame are same. In an embodiment of the present invention, as shown in FIG. 22, a valid image zone corresponding to each point light source which emits light in a subsequent fingerprint acquisition cycle at least partially covers an invalid image zone corresponding to each point light source which emits light in a preceding fingerprint acquisition cycle. Here, as shown in FIG. 21, TX_1 represents a valid image zone corresponding to each point light source which emits light in a first fingerprint acquisition cycle (namely, a preceding fingerprint acquisition cycle). WX_1 represents an invalid image zone corresponding to each point light source which emits light in the first fingerprint acquisition cycle (namely, the preceding fingerprint acquisition cycle). TX_2 represents a valid image zone corresponding to each point light source which emits light in a second fingerprint acquisition cycle (namely, a subsequent fingerprint acquisition cycle). Here, TX_2 partially covers WX_1. Of course, a valid image zone corresponding to each point light source which emits light in the subsequent fingerprint acquisition cycle can completely cover an invalid image zone corresponding to each point light source which emits light in the preceding fingerprint acquisition cycle. No limit is made here.

Of course, in the embodiment, valid image zones corresponding to point light sources which emit light in two adjacent fingerprint acquisition cycles can also satisfy the condition that they do not overlap with each other. No limit is made here.

A driving method according to an embodiment of the present invention is described with reference to FIG. 22, FIG. 13 and FIG. 14. The driving method according to the embodiment of the present invention may comprise the following steps:

(1) In a first fingerprint acquisition cycle Z_1 in fingerprint input stage, obtain information of change of capacitance value corresponding to each capacitive touch control electrode in a fingerprint recognition apparatus. According to the information of change of the capacitance value, after a finger touching zone is determined, control each point light source to emit light simultaneously, and obtain electric signal generated by each image sensor in the finger touching zone. Here, a valid image zone corresponding to point light sources which emit light in the fingerprint acquisition cycle Z_1 is TX_1.

(2) When the fingerprint acquisition cycle Z_1 is completed, enter a subsequent fingerprint acquisition cycle Z_2 after a preset residual image fading period. In the subsequent fingerprint acquisition cycle Z_2, control each point light source to emit light simultaneously, and obtain electric signal generated by each image sensor in the finger touching zone. Here, a valid image zone corresponding to point light sources which emit light in the fingerprint acquisition cycle Z_2 is TX_2. Thus, a missing part in the fingerprint image obtained in the fingerprint acquisition cycle Z_1 can be made up.

Then, the rest is carried out in a way similar to step (1)-(2). Point light sources can move along a row direction F1, until all fingerprint acquisition cycles are completed, so that all electric signals corresponding to the fingerprints of a finger are obtained.

(4) Based on electric signals obtained in each fingerprint acquisition cycle, determine a complete image of the fingerprints of the finger. In an embodiment, the complete image of the fingerprints of the finger is determined by using a stitching method.

(5) Extract image characteristics corresponding to multiple fingerprint characteristic points from the complete image and store the image characteristics to a fingerprint database.

(6) In fingerprint recognition stage, in a first fingerprint recognition frame SZ_1 of a first fingerprint recognition cycle, obtain information of change of capacitance value corresponding to each capacitive touch control electrode in the fingerprint recognition apparatus. According to the information of change of the capacitance value, after the finger touching zone is determined, control each point light source y_1 to emit light simultaneously, and obtain electrical signals generated by each image sensor in the finger touching zone.

(7) Then, enter a fingerprint recognition frame SZ_2. In the fingerprint recognition frame SZ_2, control each point light source y_2 to emit light simultaneously, and obtain electrical signal generated by each image sensor in the finger touching zone.

(8) Based on electric signal obtained in fingerprint frames SZ_1-SZ_2 of a first fingerprint recognition cycle, determine image characteristics corresponding to the fingerprint characteristic points of the current fingerprint.

(9) Determine whether similarity degree between image characteristics corresponding to fingerprint characteristic points of the first fingerprint recognition cycle and image characteristics corresponding to fingerprint characteristic points stored in the fingerprint database in step (1)-(5) meets a preset similarity degree threshold value. If yes, then step (10) is executed; if not, step (11) is executed.

(10) The current fingerprint is determined to match a stored fingerprint. Then, turn on the fingerprint recognition apparatus, and enter a subsequent fingerprint recognition stage.

(11) The current fingerprint is determined not to match any stored fingerprint. Then, the fingerprint recognition apparatus cannot be turned on, and enter into a subsequent fingerprint recognition cycle to carry out fingerprint acquisition again, until the current fingerprint is determined to match a stored fingerprint, or the fingerprint recognition stage is ended.

An embodiment of the present invention further provides a fingerprint recognition device, comprising a fingerprint recognition apparatus and a driving circuitry. Here, as shown in FIG. 1, the fingerprint recognition apparatus may comprise a substrate 100, a plurality of pixel units 110 located at a side of the substrate 100, and a plurality of image sensors 120 located at a side of the substrate 100 facing the pixel units 110; here, the image sensors 120 are used for receiving light reflected by an interface. Each pixel unit 110 comprises a plurality of sub-pixels 111.

In addition, in a fingerprint input stage, the driving circuitry is configured to control point light sources with a same light emitting sequence in two adjacent fingerprint acquisition cycles to emit light with an interval which is a preset residual image fading period, so that a valid image zone corresponding to point light sources with a same light emitting sequence in a subsequent fingerprint acquisition cycle overlaps with a corresponding residual image zone in a preceding fingerprint acquisition cycle; here, each point light source comprises at least one sub-pixel. When a point light source emits light, a plane where the interface touched by a finger is located has a light transmission zone and a total-reflection zone which surrounds the light transmission zone. After been reflected by an interface, light in the total reflection zone forms an annular image zone on the plane where image sensors are located. The valid image zone surrounds an invalid image zone. The invalid image zone has a residual image zone.

The fingerprint recognition device according to an embodiment, through the driving circuitry, control point light sources with a same light emitting sequence in two adjacent fingerprint acquisition cycles to emit light with an interval which is the preset residual image fading period, so that, a residual image, which is generated after an image sensor in the residual image zone corresponding to point light sources with a same light emitting sequence in a preceding fingerprint acquisition cycle receives light, can dissipate into an error-acceptable range after the preset residual image fading period, so that for the image sensor, the residual image can be regarded as already faded in a subsequent fingerprint acquisition cycle. In this way, a valid image zone corresponding to point light sources with a same light emitting sequence in the subsequent fingerprint acquisition cycle can overlap with a residual image zone corresponding to point light sources with a same light emitting sequence in a preceding fingerprint acquisition cycle, so that a missing part in the preceding fingerprint acquisition cycle is obtained, so that in each fingerprint acquisition cycle, accuracy of electric signal of image sensors in a valid image zone corresponding to point light sources with a same light emitting sequence is improved. Further, accuracy of fingerprints acquired is improved, effectiveness of fingerprint recognition is improved.

In an embodiment, as shown in FIG. 1 and FIG. 5, the image sensors 120 may be located at a side of the substrate 100 opposite the sub-pixel electroluminescent diode 112. Further, in an embodiment, the fingerprint recognition apparatus may further comprise: a support substrate 300 attached to a side of the substrate 100 opposite the sub-pixel 111. Here, the image sensor 120 is arranged on a surface of the support substrate 300 facing the substrate 100. In an embodiment, adhesive is arranged between the support substrate 300 and the substrate 100, so that the support substrate 300 and the substrate 100 can be fitted tightly through the adhesive. Here, the support substrate 300 can be a glass substrate, therefore, photoelectric diodes can be arranged in a large area relative to silicon substrate.

In an embodiment, a photodiode may comprise: a photosensitive diode made of organic photosensitive material, or a PIN diode. Here, an intrinsic layer in the PIN diode can use a-Si, a characteristic layer can use a-Si doped with P or B. Further, in order to prevent external light from affecting the photodiode through transmitting through the support substrate 300, a light shielding layer can also be arranged between the photodiode and the support substrate. In addition, the orthographic projection of the light-shielding layer on the support substrate covers with the orthographic projection of the photodiode on the support substrate.

In an embodiment, a thin film packaging layer, a touch capacitive electrode layer, a polarizer and a protective glass are sequentially arranged at a side of the electroluminescent diode opposite the substrate 100.

In an embodiment, the fingerprint recognition apparatus can be set as a display apparatus. In this way, the fingerprint recognition apparatus can further have function of display. Further, in a display stage, the drive circuitry can be configured to drive the fingerprint recognition apparatus to display an image. In an embodiment, the display apparatus can be any products or component which has function of display such as: a mobile phone, a tablet computer, a television, a monitor, a notebook computer, a digital photo frame, a navigator, etc. Other components which are indispensable to the display apparatus, as should understood by an ordinary technical person with skill in the art, are not redundantly described here, and also should not be regarded as limit for the present invention.

In an embodiment, the driving circuitry may also implement the steps of any above driving methods according to embodiments of the present invention. No redundant description is given here.

Based on the same inventive concept, an embodiment of the present invention further provides a computer readable storage medium on which a computer program is stored. When the program is executed by a processor, the steps of any one of above driving methods according to embodiments of the present invention are realized. In an embodiment, the present invention can adopt a form of a computer program product implemented on one or more computer readable storage medium that stores a computer usable program code. The computer readable storage medium can be implemented in any type of volatile or non-volatile memory device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk. The processor may be a central processing unit (CPU) or a field programmable logic array (FPGA) or a microcontroller (MCU) or a digital signal processor (DSP) or a programmable logic device (PLD) or an application specific integrated circuit (ASIC) having data processing capabilities and/or program execution capabilities. When the processor executes the program, the steps of any one of the above driving methods according to embodiments of the present invention are realized.

Based on the same inventive concept, an embodiment of the present invention further provides a computer apparatus comprising a memory, a processor and a computer program which is stored in the memory and can run on the processor.

The driving method of the fingerprint recognition apparatus, the fingerprint recognition device, the computer readable storage medium and computer device according to embodiments of the present invention, through fingerprint input stage, control the interval between the time when light of a residual image zone received and the time when light of a valid image zone received by a same image sensor to be at least a preset residual image fading period. In this way, a residual image generated after the image sensor receiving light of the residual image zone, can dissipate into an error-acceptable range after the preset residual image fading period. Therefore, when the image sensor receives light in a valid image zone, the residual image can be regarded as already eliminated, so that accuracy of electric signal generated by the image sensor is improved. Further, accuracy of fingerprints acquired is improved, and effectiveness of fingerprint recognition is improved.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
    driving a first subset of a plurality of light sources located on an apparatus to turn on;
    capturing a first fingerprint acquisition frame using a plurality of image sensors on the apparatus, wherein, for each light source of the plurality of light sources being turned on, light reflected from a finger touching interface forms a valid image zone and an invalid image zone, and the first fingerprint acquisition frame includes a first set of valid image zones and a first set of invalid image zones generated by the first subset of the plurality of light sources being turned on;
    driving a second subset of the plurality of light sources to turn on, the second subset of the plurality of light sources having no overlap with the first subset of the plurality of light sources; and
    capturing a second fingerprint acquisition frame using the plurality of image sensors, wherein the second fingerprint acquisition frame includes a second set of valid image zones and a second set of invalid image zones generated by the second subset of the plurality of light sources being turned on, and the second set of valid image zones at least partially covers areas of the finger touching interface different from the first set of valid image zones;
    wherein each invalid image zone further includes a residual image zone that contains a residual image after a fingerprint acquisition frame has been captured,
    at least one of the plurality of image sensors is positioned in a residual image zone of the first fingerprint acquisition frame and in a valid image zone of the second fingerprint acquisition frame, and
    the second fingerprint acquisition frame is captured at least a preset residual image fading period later after the first fingerprint acquisition frame is captured.

2. The method of claim 1, wherein the first fingerprint acquisition frame is captured during a first fingerprint acquisition cycle and the second fingerprint acquisition frame is captured in a second fingerprint acquisition cycle that is after the first fingerprint acquisition cycle;
    the first and second subsets of the plurality of light sources are turned on at a same time slot during their respective fingerprint acquisition cycles.

3. The method of claim 2, wherein the first and second fingerprint acquisition cycles are part of a plurality of fingerprint acquisition cycles, each of the plurality of fingerprint acquisition cycles includes obtaining N fingerprint acquisition frames with N being an integer larger than one, obtaining each of the N fingerprint acquisition frames includes driving different subsets of the plurality of light sources within a finger touching zone to turn on simultaneously and obtaining electrical signals from at least some image sensors of the plurality of image sensors located in the finger touching zone, the valid image zones of any one of the N fingerprint acquisition frames do not overlap with the residual image zones of any other one of the N fingerprint acquisition frames, and a subsequent fingerprint acquisition cycle starts after a preceding fingerprint acquisition cycle has lasted the preset residual image fading period.

4. The method of claim 3, wherein the second fingerprint acquisition frame is an n-th fingerprint acquisition frame during the second fingerprint acquisition cycle, and the first fingerprint acquisition frame is one of first to n-th fingerprint acquisition frames during the first fingerprint acquisition cycle, n is a positive integer less than or equal to N.

5. The method of claim 4, wherein the second fingerprint acquisition frame has at least one valid image zone at least partially overlap with one residual image zone of an n-th fingerprint acquisition frame during a preceding fingerprint acquisition cycle.

6. The method of claim 4, wherein the second fingerprint acquisition frame has at least one invalid image zone at least partially overlap with one residual image zone of an n-th fingerprint acquisition frame during a preceding fingerprint acquisition cycle.

7. The method of claim 1, wherein the apparatus is a display panel, the plurality of light sources are sub-pixels of the display panel and the finger touching interface is a cover glass of the display panel.

8. The method of claim 1, further comprising:
sequentially driving different subsets of the plurality of light sources to turn on and capturing different fingerprint acquisition frames using the plurality of image sensors;
combining all captured fingerprint acquisition frames to obtain a fingerprint image;
extracting a first set of fingerprint characteristics from the fingerprint image; and
storing the first set of fingerprint characteristics extracted from the fingerprint image to a fingerprint database.

9. The method of claim 8, further comprising:
performing fingerprint recognition by:
capturing one or more fingerprint acquisition frames;
obtaining a second set of fingerprint characteristics from the one or more fingerprint acquisition frames; and
comparing the second set of fingerprint characteristics with the first set of fingerprint characteristics stored in the fingerprint database to determine whether there is a fingerprint match.

10. The method of claim 9, wherein at least one of the one or more fingerprint acquisition frames has valid image zones overlapping with invalid image zones in another one of the one or more fingerprint acquisition frames.

11. The method of claim 1, further comprising:
obtaining a set of fingerprint characteristics from the first and second fingerprint acquisition frames; and
comparing the set of fingerprint characteristics with fingerprint characteristics stored in a fingerprint database.

12. The method of claim 1, further comprising:
determining a finger touching zone on the apparatus, wherein the apparatus comprises a plurality of capacitive touch control electrodes configured to change their respective capacitance values in response to pressure on the finger touching interface, the plurality of light sources are located within the finger touching zone.

13. A computer program product comprising a non-transitory computer readable medium having instructions recorded thereon, the instructions when executed by a processor cause the processor to:
drive a first subset of a plurality of light sources located on an apparatus to turn on;
capture a first fingerprint acquisition frame using a plurality of image sensors on the apparatus, wherein, for each light source of the plurality of light sources being turned on, light reflected from a finger touching interface forms a valid image zone and an invalid image zone, and the first fingerprint acquisition frame includes a first set of valid image zones and a first set of invalid image zones generated by the first subset of the plurality of light sources being turned on;
drive a second subset of the plurality of light sources to turn on, the second subset of the plurality of light sources having no overlap with the first subset of the plurality of light sources; and
capture a second fingerprint acquisition frame using the plurality of image sensors, wherein the second fingerprint acquisition frame includes a second set of valid image zones and a second set of invalid image zones generated by the second subset of the plurality of light sources being turned on, and the second set of valid image zones at least partially covers areas of the finger touching interface different from the first set of valid image zones;
wherein each invalid image zone further includes a residual image zone that contains a residual image after a fingerprint acquisition frame has been captured,
at least one of the plurality of image sensors is positioned in a residual image zone of the first fingerprint acquisition frame and in a valid image zone of the second fingerprint acquisition frame, and
the second fingerprint acquisition frame is captured at least a preset residual image fading period later after the first fingerprint acquisition frame is captured.

14. An apparatus comprising:
a cover glass;
a plurality of light sources configured to shine their light on the cover glass when turned on;
a plurality of image sensors configured to capture light reflected from the cover glass; and
control circuitry configured to:
drive a first subset of the plurality of light sources to turn on;
capture a first fingerprint acquisition frame using at least a subset of the plurality of image sensors, wherein, for each light source being turned on, light reflected from the cover glass forms a valid image zone and an invalid image zone, and the first fingerprint acquisition frame includes a first set of valid image zones and a first set of invalid image zones generated by the first subset of the plurality of light sources being turned on; and
perform fingerprint recognition using the first fingerprint acquisition frame;
wherein each of the plurality of light sources is a point light source and the first subset of light sources form a repeated pattern of rectangles, polygons with more than four sides or circles;

wherein each of the valid image zone is formed by light reflected from a total reflection zone of one of the plurality of light sources on the cover glass.

15. The apparatus of claim 14, further comprising a substrate and a support substrate, wherein the plurality of plurality of light sources are a plurality of sub-pixels located on the substrate and the plurality of image sensors are located on the support substrate, and the support substrate is glued to the substrate.

16. The apparatus of claim 14, wherein the control circuitry is further configured to:
    drive a second subset of the plurality of light sources to turn on, the second subset of the plurality of light sources having no overlap with the first subset of the plurality of light sources; and
    capture a second fingerprint acquisition frame using at least the subset of the plurality of image sensors, wherein the second fingerprint acquisition frame includes a second set of valid image zones and a second set of invalid image zones generated by the second subset of the plurality of light sources being turned on, and the second set of valid image zones at least partially cover areas of the cover glass different from the first set of valid image zones.

17. The apparatus of claim 16, further comprising combining the first and second fingerprint acquisition frames for the fingerprint recognition.

18. The apparatus of claim 16, wherein each invalid image zone includes a residual image zone that contains a residual image after a fingerprint acquisition frame has been captured,
    at least one of the plurality of image sensors is positioned in a residual image zone of the first fingerprint acquisition frame and in a valid image zone of the second fingerprint frame, and
    the second fingerprint acquisition frame is captured at least a preset residual image fading period later after the first fingerprint acquisition frame is captured.

* * * * *